(12) United States Patent  (10) Patent No.: US 8,595,324 B2
Carrigan et al.  (45) Date of Patent: Nov. 26, 2013

(54) APPARATUS FOR FACILITATING CONTROL OF A TARGET COMPUTER BY A REMOTE COMPUTER

(75) Inventors: Brian J. Carrigan, Ontario (CA); Peter D. Gray, Ontario (CA)

(73) Assignee: Digital Multitools Inc., Richmond Hill, Ontario (CA)

( * ) Notice: Subject to any disclaimer, the term of this patent is extended or adjusted under 35 U.S.C. 154(b) by 803 days.

(21) Appl. No.: 12/098,655

(22) Filed: Apr. 7, 2008

(65) Prior Publication Data

US 2010/0011355 A1 Jan. 14, 2010

Related U.S. Application Data

(62) Division of application No. 10/775,306, filed on Feb. 10, 2004, now abandoned.

(30) Foreign Application Priority Data

Jan. 9, 2004 (CA) ..................................... 2455043

(51) Int. Cl.
 *G06F 15/16* (2006.01)
(52) U.S. Cl.
 USPC ............................ 709/218; 709/217; 709/220
(58) Field of Classification Search
 USPC ................................. 709/218, 213, 217, 220
 See application file for complete search history.

(56) References Cited

U.S. PATENT DOCUMENTS

| | | | |
|---|---|---|---|
| 5,347,646 A | 9/1994 | Hirosawa et al. | |
| 5,438,674 A * | 8/1995 | Keele et al. | ........................ 711/4 |
| 5,499,377 A | 3/1996 | Lee | |
| 5,721,842 A | 2/1998 | Beasley et al. | |
| 5,884,096 A | 3/1999 | Beasley et al. | |
| 5,937,176 A | 8/1999 | Beasley et al. | |
| 6,070,253 A | 5/2000 | Tavallaei et al. | |
| 6,137,455 A | 10/2000 | Duo | |
| 6,219,695 B1 | 4/2001 | Guttag et al. | |
| 6,304,895 B1 * | 10/2001 | Schneider et al. | ............ 709/203 |
| 6,324,605 B1 | 11/2001 | Rafferty et al. | |
| 6,378,009 B1 | 4/2002 | Pinkston, II et al. | |
| 6,378,014 B1 | 4/2002 | Shirley | |
| 6,388,658 B1 | 5/2002 | Ahem et al. | |
| 6,539,418 B2 * | 3/2003 | Schneider et al. | ............ 709/203 |

(Continued)

OTHER PUBLICATIONS

KVM Buyers Guide, www.avocent.com/CYbex/PublicW2.nsf/4a7fe58a7d2fdfe886256a390072928b/3eee3450aa . . . .

(Continued)

*Primary Examiner* — Philip B Tran
(74) *Attorney, Agent, or Firm* — The Webb Law Firm

(57) ABSTRACT

A device for permitting control of a target computer by a remote computer is operatively connectable to the remote computer so as to receive remote computer mouse and keyboard signals and transmit video update data to the remote computer. The device is operatively connectable to the target computer so as to provide the remote computer keyboard and mouse signals as control inputs to the target computer and so as to receive a target computer video signal for generation of video update data. The device includes a virtual memory disk, wherein the virtual floppy disk includes a memory space associated with the device. The device is configured to permit a user of the remote computer to mount the device to the remote computer, transfer data to the virtual memory disk, and unmount the virtual memory disk.

19 Claims, 10 Drawing Sheets

(56) References Cited

U.S. PATENT DOCUMENTS

| | | | |
|---|---|---|---|
| 6,557,170 B1 * | 4/2003 | Wilder et al. | 725/130 |
| 6,671,756 B1 * | 12/2003 | Thomas et al. | 710/73 |
| 6,701,380 B2 * | 3/2004 | Schneider et al. | 709/250 |
| 6,738,100 B2 | 5/2004 | Hampapur et al. | |
| 6,901,455 B2 * | 5/2005 | Gough | 710/8 |
| 7,234,006 B2 * | 6/2007 | Westrelin | 710/22 |
| 7,284,278 B2 * | 10/2007 | Anson et al. | 726/34 |
| 7,308,147 B2 | 12/2007 | Sano | |
| 7,782,893 B2 * | 8/2010 | Pettey et al. | 370/463 |
| 7,797,257 B2 * | 9/2010 | Barnhill et al. | 706/13 |
| 7,947,331 B2 * | 5/2011 | Liao et al. | 427/294 |
| 2002/0038334 A1 | 3/2002 | Schneider et al. | |
| 2002/0072892 A1 | 6/2002 | Shirley | |
| 2002/0091850 A1 | 7/2002 | Perholtz et al. | |
| 2003/0135656 A1 | 7/2003 | Schneider et al. | |

OTHER PUBLICATIONS

FreeVision Extender, www.cccnetsys.com/products/free_vision_extender.asp.

Paragon, "It's Time to Power Up", www.raritan.com.

Paragon, "The Most Complete Enterprise-Class KVM Solutionwith Cat5 Simplicity", www.raritan.com/products_paragon_index.html.

Design, Development & Remote Management Solutions for the Global Server Farm, www.ccnetsys.com/skip_intro.asp.

Poor Mouse Control Hurts Digital KVM Switch, www.nwfusion.com/reviews/2001/0115rev3.html.

KVM Switch Over IP, www.kvmswitchoverip.com.

DS 1800 Digital KVM Switch, www.e-business.com/products/DS1800.htm.

Avocent DS 1800, www.kvmoverip.com.

What is Digital KVM?, www.kvmoverip.com/whatis.digitalkvm.asp.

* cited by examiner

FPGA Video Processing

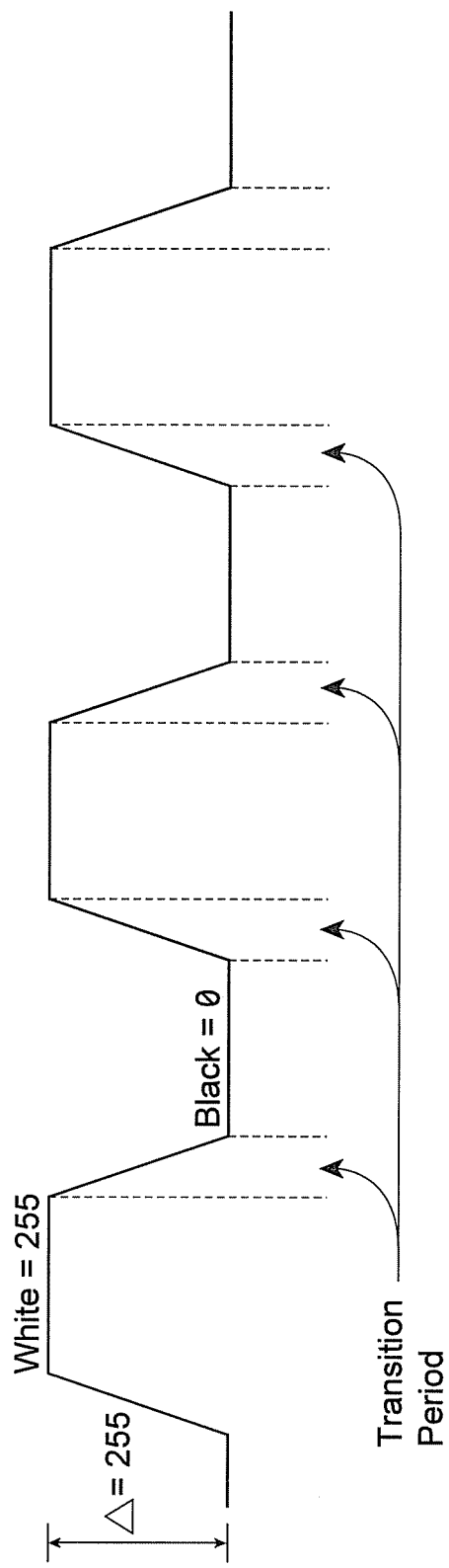

APPARATUS FOR FACILITATING CONTROL OF A TARGET COMPUTER BY A REMOTE COMPUTER

FIELD OF THE INVENTION

This invention relates to the field of computer maintenance, and in particular, the field of computer network maintenance.

DESCRIPTION OF RELATED ART

As computer networks have become more and more extensive, the challenges associated with maintenance and control of such networks has become exponentially larger. In a typical setting, the operators of computer stations are not the same people as those who maintain the computer hardware and software. In the case of computer server hardware, there are no explicit operators, in the sense that computer servers are not used directly by users to do their work. Instead, users typically do their work at one of many computers connected to the server. Thus, in the case of computer servers, the servers are only used directly when maintenance is being performed on the server. As computer networks have become larger, it has become necessary to have specialized groups of people responsible for maintenance of computer equipment, including servers.

Maintenance of computers takes a number of forms. For example, it involves fixing computer equipment after it has failed. However, in an attempt to reduce downtime, many owners of computer networks have taken a preventative approach to maintenance. Preventative maintenance includes monitoring for problems, solving problems after they are detected, and deploying upgrades to prevent future problems. Maintenance may also include the adding of features, applications and data to the computer.

The increased size of computer networks has also led to a change in the physical arrangement of networks, and the way they are communicated with by maintenance personnel. Often, computer networks are very large, and may include hundreds or even thousands of servers located in separate server rooms far removed from the location of maintenance personnel. Therefore, direct use of the servers by maintenance personnel is impractical. Furthermore, even if the maintenance personnel are on location, it is impractical for them to conduct maintenance activities on hundreds or thousands of target computer servers by moving physically from one server to the next.

One basic requirement for maintenance personnel, in accomplishing their task of monitoring the target computers, is that the status information being monitored be made available to the maintenance personnel. There are two main categories of target computers that maintenance personnel would typically monitor. The first consists of computers that are primarily based on a graphical interface, and the second consists of computers that are primarily based on a command line interface. In graphical interface-based computers, such as those using the Windows™ operating system, the system information is available as a graphical display on the target computer's screen. Therefore, to have this information, maintenance personnel at a remote location must have access to the target computer's video in order to monitor the target computer.

In command line-based computers, such as those using Unix™ or Unix-derivative operating systems, a log file is generally available with periodic status reports. This log file would be available to a local user of a computer and could be displayed on the screen. For maintenance personnel to monitor such a computer, they need to have access, at the remote location, to this log file.

In addition, maintenance personnel must be able to choose among various types of information available from the target computer in order to monitor effectively. This involves the maintenance personnel having access to the standard input devices of the target computer. Typically, the standard input devices are the keyboard and mouse, but they may also include such items as graphic tablets and serial console ports.

Conducting maintenance activities involving upgrades also requires control of the target computer. This includes having access to the screen shot or log file, and the standard input and output devices of the computer. It is also necessary for maintenance personnel to have access to the media on which the upgrade information are stored. If the medium is, for example, a CDROM or floppy disk, the maintenance personnel have historically needed to be physically present at the target computer to insert the CDROM and swap CDROMs as required.

In the past, to provide the necessary access for maintenance personnel to the target computers, "KVM" switches were developed. "KVM" stands for Keyboard Video and Mouse. The purpose of a KVM switch is to provide remote access to a target computer.

Early KVM switches were analog, connecting one or more target computers and one or more remote users. This would allow a remote user to select, usually by moving a mechanical switch, which target computer's keyboard, video and mouse he would have access to.

Analog KVM switches can be relatively inexpensive. As well, their "perceived performance" can be quite good, meaning that a user accessing a target computer from a remote location from an analog KVM switch will have an experience very similar to the experience he would have if he were using the target computer directly. However, analog KVM switches have a number of disadvantages. Very basic analog KVM switches require the operator to be co-located with the target computers. In other words, if a user wishes to have access to eight different computers through a basic analog KVM switch, he must be co-located with those eight computers, and can access each one in turn by actuating the switch. To use analog KVM switches in circumstances where the user is located remotely from the target computers, analog KVM extenders are required. However, even analog KVM extenders often place strict constraints on the physical distance between the user and the target computers. Such extenders typically require that the user be located within 300 meters of the target computers.

Another disadvantage of analog KVM switches is that they are not easily scalable. In other words, creating networks of KVM switches, and adding additional target and remote computers to that network is difficult, usually resulting in escalating costs and reduced performance. U.S. Pat. Nos. 5,721, 842; 5,884,096; 5,937,176; 6,378,009; and 6,388,658 disclose various analog KVM switches and extenders having these disadvantages.

Another related problem with analog KVM switches is that if the remote site is far removed from the target site, the receiver of the KVM switch must be hand-tuned for optimal video performance. Without such hand tuning, the video quality at the remote computer suffers, resulting in a lower-than-optimal perceived performance. The requirement of hand-tuning makes the installation of a network of analog of KVM switches cumbersome and expensive.

Subsequent to the development of analog KVM switches, digital KVM switches were developed. A digital KVM switch is typically connected on one side to a target computer. The other end of the switch is connected to a LAN port, and ultimately to the internet or another network. The remote computers receive the target video, and transmit keyboard and mouse signals, over that network. Unlike the analog approach to switching video, keyboard and mouse information, the digital KVM digitizes the video received from the target computer, and then transmits it to the remote computer via the LAN link.

Digital KVMs may also be attached to multiple target computers via an analog KVM switch. This allows the digital KVM switch to access more than one target computer. In some products, the digital KVM and analog KVM are integrated into the same unit.

A typical digital KVM switch consists of an analog-to-digital converter (ADC) for capturing the target's video signal and converting it to digital format; a frame storage device, sometimes referred to as a "frame grabber"; and a CPU. U.S. Pat. No. 6,539,418 discloses a KVM switch with these general features.

A typical target computer puts out a video signal containing a very large amount of raw data. A typical video resolution is 1024 pixels per horizontal video line, with 768 lines per video frame and 60 complete frames transmitted per second. Each pixel on a colour monitor may have a red component, a green component and a blue component. Most computers use 8 bits of information for each of these components, resulting in a 24-bit colour word representing each pixel. In this example, then, the target video signal consists of 1,132,462,080 bits per second (1.132 gigabits). This bit rate is substantially higher than the capacity of any practically-available LAN connection. As a result, digital KVM devices typically use some form of video data reduction technology. One approach is to compare successive video frames and extract pixel differences between successive frames. This uses far less bandwidth then transmitting every whole new frame to the remote computer. In one typical difference calculation method, the digital KVM switch captures an entire video frame. After the entire new video frame is captured, each pixel is compared with the corresponding pixel in the previous video frame. Once all the pixel changes have been determined, the differences between the new frame and the previous frame are sent to the remote computer, and the video on the remote computer is updated to match the new frame that has been received from the target computer.

Digital KVM technology has an advantage over analog KVM technology, in that it is better able to handle situations where the remote computer is distant physically from the target computer or computers. However, digital KVM also introduces a number of disadvantages not present with analog KVM technology. The first main disadvantage is perceived performance. With digital KVM, there is often a noticeable lag at the remote computer between when a control input occurs (e.g. the movement of a mouse) and when the video display shows the response (e.g. the mouse arrow moving on the screen). The size of this time lag can be related to several factors. The first factor is how quickly the digital KVM switch can calculate differences in successive video frames. The longer such calculation takes, the longer it will take to see the results of a control input on the video screen of the remote terminal. Also, longer difference calculation times can lower the number of frames that are actually processed by the KVM switch. For example, in a video signal consisting of 60 frames per second, a new frame is generated every 16.7 milliseconds. However, if the difference calculation takes 32 milliseconds, then the KVM switch will have to skip at least every second frame. When frames are missed by the KVM switch, the motion on the video screen of the remote terminal will appear jerky, with missing information, rather than smooth, as is would be the case if every frame were processed by the KVM switch.

The second factor affecting speed is the amount of time the digital KVM takes to generate the data to be sent to the remote terminal. The KVM, after calculating the differences between a new frame and the previous frame, must then translate the difference information into actual frame pixel information. In a typical digital KVM, the frame grabber captures a single frame of video. After that frame is captured in its entirety, a microprocessor loads the frame into its own working memory. The difference calculation is performed by the microprocessor to determine the differences between the just-captured frame and the previous frame. Then, the same microprocessor translates that difference information into actual frame pixel information.

This typical KVM implementation creates certain disadvantages. As described above, the rate of data being generated by the target computer's video signal is very large. Thus, the digital KVM requires a CPU with a very high data processing rate, which translates into higher CPU costs. In addition, there is less processing power available for other features. In some applications, security concerns require that the digital KVM be able to encrypt its video, keyboard and mouse information, so that the data cannot be easily intercepted. This is particularly important in cases where the KVM is connected to the remote computer via the internet. However, such encryption requires significantly more CPU processing power. Historically, this extra power requirement has been a barrier to traditional digital KVM technology providing encryption, except at much higher system costs, or by sacrificing perceived performance.

There are other issues raised by the specific method by which digital KVM technology operates. In analog KVM technology, the target computer's video signal is simply received and routed to the remote computer. However, digital KVM technology requires digitizing the video signal, and then calculating differences between the new frame the previous frame. A typical video signal has a particular predetermined resolution which specifies the number of pixels per line, and the number of lines per video frame. In the analog domain, each line of video has an active area, where the actual screen picture information is contained, and a blanking area, usually represented in the colour black. The blanking area is added to each line to provide the extra time between lines for repositioning the scanning electron beams that create the image on the screen. The blanking area at the end of each line contains a horizontal-sync or H-sync pulse, which the monitor uses to determine when the electron beam should realign itself.

Similarly, the entire video frame has an active area and a blanking area containing lines not included in the active video region. During the blanking area, a vertical-sync or V-sync pulse is transmitted. This pulse is used by the CRT to cause the electron beam to move back to the beginning of the frame.

The time between the end of the H-sync pulses and the start of the active portion of the next line of video is arbitrary, but will be constant for a particular implementation of a particular video rate or resolution. Similarly, the time between the end of the V-sync pulse and the start of the active portion of the next video frame is arbitrary, but is also constant for a particular implementation of a particular video rate or resolution.

To a local user of a computer, a variance between different video rates can be dealt with by adjusting certain control parameters. Most monitors have a control to adjust the times between the sync pulses and the active region of the video. When the beam speed is incorrect, the picture will either appear "squished", that is, smaller than the screen, or "stretched", that is, larger than the screen. Most monitors have a control to adjust beam speed.

A remote user of a target computer through a KVM does not have access to these controls on the target computer's monitor. Also, with digital KVM, the ADC must extract each pixel from the analog video signal's waveform. This is accomplished by sampling. Ideally, sampling will take place at the precise centre of the time allocated to each pixel. However, the pixels can be located only with reference to the sync pulses, and the location of the sync pulses is arbitrary.

There are a number of problems that can arise from improper predictions of pixel timing, resulting in incorrect sampling. For example, the video image produced by the digital KVM could have some pixels or lines cut off on the picture edges, or some pixels or lines added to the picture edges. A further effect of incorrect pixel sampling is sample jitter. If pixels are sampled near the edges, instead of at their central point, then the repeated sampling of an unchanged pixel will sometimes result in one sampled value. Such dithering between two or more similar values will cause the KVM to think that a pixel has changed, even if it has not. This results in the generation of extraneous data, and unnecessary bandwidth usage. This in turn results in slower response times of the KVM, since there is less bandwidth available to transmit the real differences between the current frame and the previous frame.

SUMMARY OF THE INVENTION

Therefore, what is preferred is a KVM system or method which addresses one or more of these problems. The invention will preferably include a KVM system or method having increased processing speed. Preferably, the system will reduce bandwidth usage and provide good usability and perceived performance for the user of the remote computer.

In one aspect of the invention, there is provided a method of capturing a new video frame from a target computer to permit the updating of a remote computer with the video output of the target computer, wherein said new video frame comprises a series of new frame pixels to be captured, which series includes an initial new frame pixel to be captured and a final new frame pixel to be captured, the new frame pixels to be captured being represented in a video signal from the target computer, the method comprising the steps of, beginning with the initial new frame pixel: (A) receiving for comparison a new frame pixel from the series; then (B) comparing the new frame pixel to a corresponding reference frame pixel; then (C) if the final new frame pixel has not been captured, repeating steps A and B for the next new frame pixel in the series.

Preferably, step B comprises the steps of determining if said new frame pixel is different from said corresponding reference frame pixel, and, if said new frame pixel is different from said corresponding reference frame pixel, flagging a new frame update unit corresponding to said new frame pixel if said corresponding new frame update unit has not already been flagged.

In another aspect of the invention, there is provided a system for capturing a new video frame from a target computer to permit the updating of a remote computer displaying the video output of the target computer, wherein the new video frame comprises a series of new frame pixels to be captured, which series includes an initial new frame pixel to be captured and a final new frame pixel to be captured, the system comprising a comparison module and a memory module operatively connected to said comparison module, the comparison module being configured to receive for comparison the initial new frame pixel from said target computer; then, compare the initial new frame pixel to a corresponding reference frame pixel and save the initial new video frame pixel in the memory module; then, if the final new frame pixel has not been captured, repeat said receiving, comparing and saving steps in respect of the next new frame pixel in the series.

In another aspect of the invention, there is provided a method of providing updated video from a target computer to a remote computer, the method comprising the steps of:
(A) performing the method of comparing as described above;
(B) searching for flags indicating flagged new frame update units; and
(C) moving flagged new frame update units to a reference frame output location for eventual transmission to the remote computer.

In another aspect of the invention, there is provided a method of determining whether to reacquire a video signal from a target computer, wherein the video signal of the target computer is being compared with reference video, and update data is being generated from the comparison for transmission to a remote computer, the method comprising the steps of:
(A) monitoring a first condition indicating information about a resolution of the video signal;
(B) monitoring a second condition indicating information about the resolution of the video signal;
(C) if the second condition changes so as to indicate a change in the resolution, but the first condition does not change so as to indicate a change in the resolution, suspending comparison and update data generation and continuing to monitor the first condition to determine whether to reacquire the video signal; and
(D) if the second condition continues to indicate a change in the resolution, and the first condition changes so as to indicate a change in the resolution, determining that the video signal will be reacquired.

In another aspect of the invention, there is provided a method of updating video from a target computer on a remote computer, the method comprising the steps of:
(i) comparing a video frame from the target computer to reference video;
(ii) generating data in the comparing step for use in updating the remote computer;
(iii) reacquiring the video signal by resuming comparison and update data generation if the regenerated H-sync recovers from its change and the raw H-sync continues to indicate no change in resolution; and
(iv) when the video signal has been reacquired, resuming said comparing and generating steps.

In another aspect of the invention, there is provided a digital KVM system comprising:
an analog-to-digital converter for digitizing an incoming video signal to produce a series of new frame pixel digital values;
a difference calculator for calculating the difference between each new frame pixel digital value and a corresponding reference frame pixel digital value, the difference calculator comprising a field programmable gate array.

In another aspect of the invention, there is provided a method for improving the promptness with which movement of a mouse at a remote computer is shown on the screen of the remote computer, wherein the mouse is used to create inputs to a target computer via a digital KVM, and the screen of the remote computer is updated by the digital KVM to display the video from the video signal of the target computer, the method comprising the steps of:

maintaining a representation of an initial position of the mouse;

receiving at the KVM an indication that the mouse has moved;

in response to the indication, interrupting a preprogrammed updating sequence of the KVM and updating the video of the remote computer to reflect the mouse movement; and resuming the preprogrammed sequence.

In another aspect of the invention, there is provided a system for regulating the transmission of video update units to M remote computers, M being a whole number greater than or equal to one, wherein video frame information is being received from a target computer and video update units being generated in response thereto, and wherein each remote computer is being updated with the update units via a corresponding communication channel having a corresponding speed, the system comprising:

an update unit generator and an update unit output location for holding for transmission pending update units generated by the update unit generator;

a scanner associated with each channel, each said scanner being configured to cause transmission of the pending update units from the output location according to a preprogrammed sequence, each scanner having an operating speed that is coordinated with the speed of the corresponding channel; and the update unit generator, output location and scanners being configured such that, if a pending update unit is superseded by a new version of the pending update unit prior to being transmitted, the new version will be transmitted and the version of the pending update unit that was superseded will not be transmitted.

Preferably, the output location is configured to hold only a most recent version of each pending update unit, and not superseded pending update units. Preferably, each update unit comprises a tile corresponding to a region of video screen pixels. Preferably, the system further includes output location individual tilestamps, the output location individual tilestamps being associated with the output location, with an output location individual tilestamp corresponding to each tile, the system further including output location row tilestamps corresponding to each row of tiles, said output location row tilestamps being associated with the output location and corresponding to each row of tiles, the output location being configured such that the output location individual tilestamps are each incremented each time the corresponding tile is transferred to the output location for transmission.

Preferably, the system further includes a tilestamp storage location associated with each scanner and its corresponding remote computer, each scanner tilestamp storage location including a storage location individual tilestamp associated with each tile and a storage location row tilestamp associated with each row of tiles, each scanner and corresponding tilestamp storage location being configured such that the preprogrammed sequence comprises:

(A) scanning each storage location row tilestamp;

(B) comparing each storage location row tilestamp to the corresponding output location row tilestamp;

(C) if the storage location row tilestamp differs from the corresponding output location row tilestamp, determining that the corresponding row contains at least one tile to be transmitted; and (D) scanning the storage location individual tilestamps corresponding to tiles within the corresponding row, comparing them to the corresponding output location individual tilestamps, transmitting each tile for which a difference is found between the corresponding storage location tilestamp and the corresponding output location tilestamp, incrementing the corresponding storage location tilestamp to make it equal in value to the corresponding output location individual tilestamp, and resuming the sequence at step A.

In another aspect of the invention, there is provided a device for permitting control of a target computer by a remote computer, wherein the device is operatively connectable to the remote computer so as to receive remote computer mouse and keyboard signals and transmit video update data to the remote computer, the device further being operatively connectable to the target computer so as to provide the remote computer keyboard and mouse signals as control inputs to the target computer and so as to receive a target computer video signal for generation of video update data, the device including a virtual memory disk, the virtual floppy disk comprising a memory space associated with the device, the device being configured to permit a user of the remote computer to mount the device to the remote computer, transfer data to the virtual memory disk, and unmount the virtual memory disk, the device further being configured to permit the user, by controlling the target computer through the remote computer, to mount the virtual memory disk to the target computer, transfer the data to the target computer, and unmount the virtual memory disk from the target computer.

BRIEF DESCRIPTION OF THE DRAWINGS

Reference will now be made, by way of example only, to drawings of the invention, which illustrate the preferred embodiment of the invention, and in which:

FIG. 11 is a diagram of an analog waveform representing a stream of alternating black and white pixels.

DETAILED DESCRIPTION OF THE INVENTION

Figure 1:
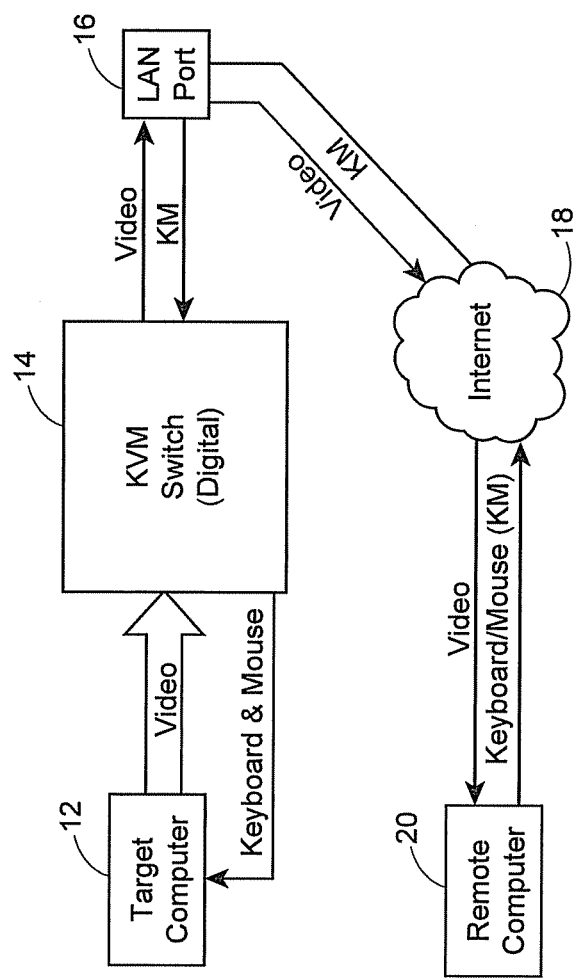
FIG. 1 is a schematic drawing of a remote computer, target computer and KVM switch according to the present invention.

Referring now to FIG. 1, a target computer 12 is shown. In the embodiment shown in FIG. 1, KVM switch 14 is connected directly to target computer 12, and receives the video signals of target computer 12. In the embodiment shown in FIG. 2, N target computers 12 (N>1) are connected through an analog KVM switch 16 to the digital KVM switch 14. In this way, users of one of M (M>1) remote computers 20, as will be more particularly described below, can receive the video signals of any one of N target computers 12, and control those target computers 12 by the keyboard and mouse signals being transmitted thereto. The user of a remote computer 20 can choose which target computer 12 is controlled by switching the analog KVM switch 16.

The KVM switch 14 is connected, preferably via a LAN port 16, to the internet, designated by reference numeral 18. The remote computer 20 receives information from the KVM switch 14 via the internet 18. It will be appreciated that the connection between the KVM switch 14 and the remote computer 20 need not necessarily be via a LAN port 16 and through the internet 18, as preferred. It is possible for the connection to take any form which permits the transmission of digital video data from the KVM switch 14 to the remote computer 20. What is important is that the remote computer 20 be connected to the KVM switch 14 in a manner that allows it to receive video update data from the KVM switch 14. Nevertheless, it will be appreciated that the preferred mode of connection between the KVM switch 14 and the remote computer 20 is one which permits the efficient transmission of digital video data from the KVM switch 14 to a remote computer 20, the remote computer 20 being remotely located from the KVM switch 14 and the target computer 12.

The remote computer 20 is connected, via the internet 18, to the KVM switch 14, which receives from the remote computer 20 its keyboard and mouse outputs. Those outputs are routed through the KVM switch 14 to the target computer 12. Thus, the remote computer can be used to control one or more target computers 12. Through the KVM switch 14 and the internet 18, the remote computer 20 receives video from the target computer 12. The video thus received can be displayed on the screen of the remote computer 20, allowing the operator at the remote computer to see the output of the target computer 12. As explained above, this output can take the form of information presented on a graphical interface (e.g. Microsoft Windows) or, it can take the form of a log file present on the target computer 12, showing its status.

To effect control of the target computer 12, the keyboard and mouse outputs of the remote computer 20 are routed to the target computer 12 via the internet 18 and KVM 14. The KVM 14 is connected to the target computer(s) 12 such that the keyboard and mouse signals from the remote computer 20 are treated by the target computer 12 as its own keyboard and mouse. Thus, action taken with the keyboard and mouse at the remote computer 20 have the same effect on the target computer 12 as if those actions have been taken locally, at the target computer 12.

Figure 3:
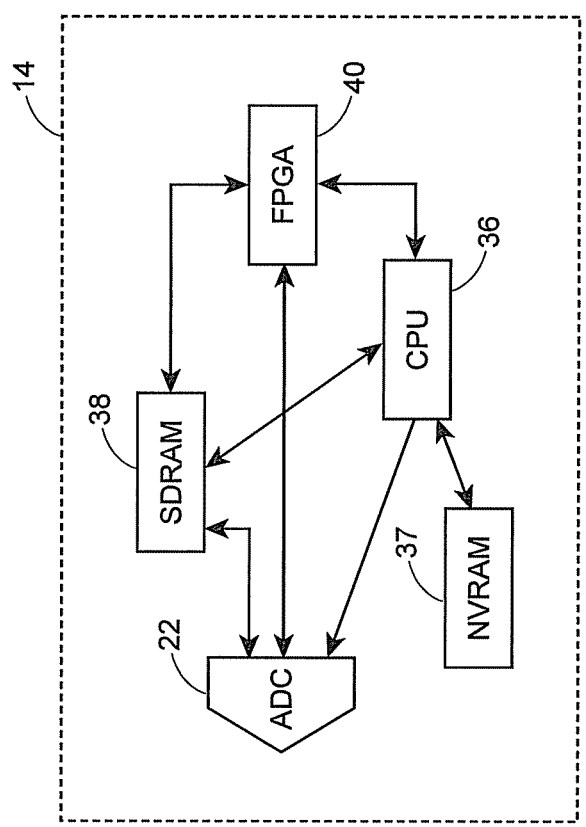
FIG. 3 is a schematic diagram of a KVM switch according to the present invention.

FIG. 3 shows preferred components included in KVM 14. These include the analog-to-digital converter (ADC) 22, a central processing unit (CPU) 36, a synchronous dynamic random access memory (SDRAM) 38 and a field programmable gate array (FPGA) 40. The specific functioning of these components will be more particularly described below. It will be appreciated that, though the SDRAM 38 is shown schematically as a single block, it may be implemented as more than one SDRAM component. Also, the SDRAM 38 may be apportioned such that the CPU 36 and FPGA 40 each have exclusive access to particular portions of the SDRAM 38.

The KVM 14 also preferably includes the CPU's non-volatile RAM (NVRAM) 37, which preferably stores, inter alia, the CPU program, the FPGA configuration, the video resolution table described below, and other system information.

It will be appreciated by those skilled in the art that the memory in the KVM 14 need not be organized in this preferred manner to be comprehended by the invention. What is preferred, however, is that sufficient and properly-configured memory be provided to perform the function herein described.

Figure 4A:
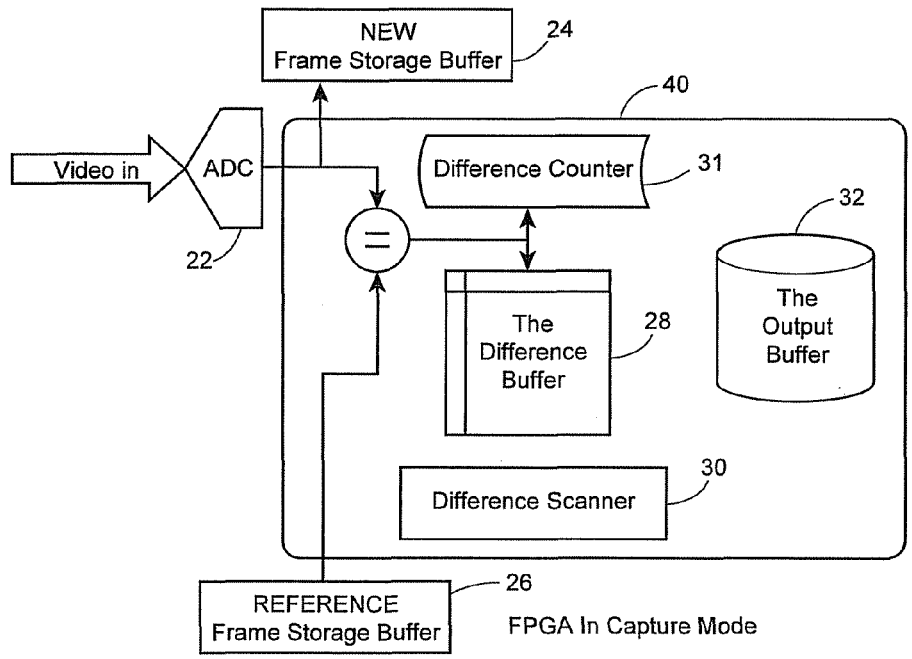
FIGS. 4A and 4B show the KVM in capture and update modes according to the present invention.

Referring now to FIG. 4A, the KVM 14 and FPGA 40 are shown in video frame capture mode, i.e. the mode in which the new video frame is received for comparison and compared to the previous one. In the preferred embodiment, the analog video signal from the target computer is converted to a digital signal by the ADC 22. The output of the ADC 22 is a series of digital values, each of which represents a pixel of the video frame being received by the ADC.

The digital KVM 14 preferably includes a new frame storage buffer 24 and a reference frame storage buffer 26. Most preferably, these buffers 24, 26 are implemented in the SDRAM. As each pixel value is outputted by the ADC 32, it is stored in the new frame storage buffer 24, whose function it is to act as a storage location for the new video frame currently being received by the ADC 22 and converted to a digital signal.

As each pixel is stored in the new frame storage buffer 24, that pixel is also compared by the FPGA 40 with the corresponding pixel from the previous (or reference) frame, which is read by the FPGA 40 from the reference frame storage buffer 26. The reference frame storage buffer 26 stores the frame that was received prior to the frame that is currently being received and stored in the new frame storage buffer 24. The timing of the reading of the reference pixel and the writing of the corresponding new to pixel to the new frame storage buffer 24 is controlled such that each pixel from the new frame is compared with the correct, corresponding, pixel from the reference frame.

If the pixel from the new frame is sufficiently different from the corresponding reference frame pixel, then a flag is set in a tile difference buffer 28 to indicate that the new frame update unit (defined below) corresponding to the new video frame pixel contains a pixel that has changed from the corresponding unit in the reference frame.

As will be more particularly described below, the digital KVM, in update mode, will send the new frame update unit identified in the tile difference buffer 28 to an output location for transmission to the remote computer 20. Thus, the new frame update unit is a unit, comprising a portion of the video frame that is sent to the remote computer 20 to update the remote computer's video output. It will be appreciated that a new frame update unit can comprise an individual pixel, or a plurality of pixels. Preferably, the new frame update unit comprises a tile, which is defined as an area of the video screen that is precisely 16 pixels wide and 16 pixels high. This implementation of the new frame update unit is preferred because the digital KVM 14 will preferably use the public domain VNC protocol for transmitting video, and the use of 16 by 16 tiles facilitates the use of this protocol. It will be appreciated that, because the tile includes 256 pixels, it will often be the case that more than one pixel in a tile will change from one frame to the next. Therefore, as the FPGA 40 compares each pixel, the first pixel difference will cause the corresponding tile to be flagged. However, other pixel differences in the same tile will not cause the tile to be flagged, because it has already been flagged as a result of the first pixel difference.

The FPGA 40 further preferably includes a difference counter 31 which counts the number of pixel differences found in each comparison between a new video frame and a reference video frame.

Figure 4B:
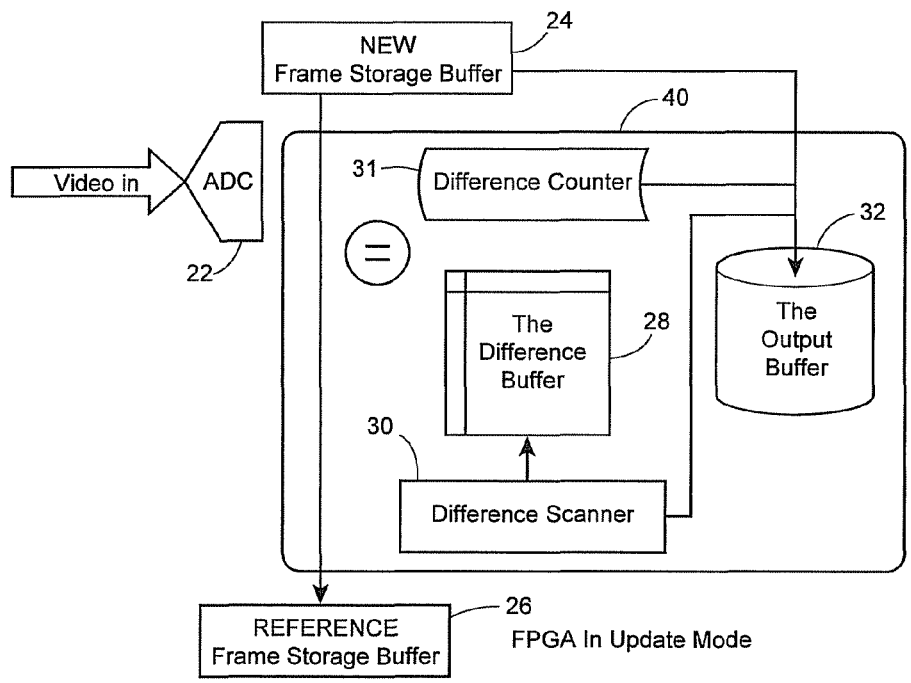

Once an entire new frame has been received, and stored in the new frame storage buffer 24, the digital KVM 14 switches to "update" mode. This mode is described in FIG. 4B. In update mode, the difference scanner 30 (which is preferably programmed and implemented as part of the FPGA 40) scans through the tile difference buffer 28, searching for flags indicating tiles containing pixels that have changed from the reference frame to the new frame. When a flag, indicating that a particular tile has changed, is found, then that tile is extracted by the FPGA 40 from the new frame storage buffer 24 and placed in the FPGA's tile output buffer 32. Preferably, the CPU 36 then copies the tile into the reference frame storage buffer 26 which preferably acts as both an output location from which the flagged tiles are eventually transmitted to the remote computer 20, and a reference frame storage location from which the reference frame is read for comparison purposes. In one preferred embodiment, the reference frame storage buffer 26 is implemented as two separate memory locations. Both locations contain the same data. The first location, associated with the FPGA 40, acts as the reference frame storage location used for comparison purposes, to which changed tiles are moved from the buffer 24 by the FPGA during update mode. The second location, associated with the CPU 36, acts as an output location from which tiles are transmitted, and to which changed tiles are moved from the buffer 32 by the CPU 36. It will be appreciated that other configurations, in which the reference frame output and storage locations are implemented in a variety of memory configurations, are comprehended by the invention.

After the tile difference buffer 28 has been thoroughly scanned for all flags indicating changes in video tiles, and once all of the flagged tiles have been moved to the tile output buffer 32 for transmission to the remote computer 20, the digital KVM reverts to "capture" mode and awaits the start of the next video frame. Once the next video frame begins, the above-described procedure for capturing the video frame is repeated.

In addition to each tile that has been flagged during the capture phase, the tile output buffer 32 also contains a status word associated with each such tile, which status word is transmitted to the remote computer 20. Two fields in the status word are the tile's horizontal and vertical coordinates on the video screen; this screen location data is moved to the tile output buffer 32 for transmission to the remote computer, to permit the tile to be displayed by the remote computer at the appropriate location.

In addition, the "average" colour of the tile is calculated, and the relevant value is moved to a third field of the status word. The "average" colour calculation is an averaging of the individual red, green and blue components in the pixels of each tile. While the average colour is calculated, the FPGA 40 scans the tile to determine if all of its pixels are the same colour. If so, the FPGA 40 sets a single colour flag in the status word.

There are two purposes for the average colour calculation. The first is that, if the user of the remote computer 20 causes a section of a screen to be reduced to a thumbnail (e.g., reduced by a factor of 16), then each tile, which is 16 pixels by 16 pixels, would show up in the thumbnail as a single pixel. The colour used for that pixel would be the "average" colour. As will be understood by those skilled in the art, the calculation of average colour facilitates the use of VNC scaling features, such as the one just described.

Another purpose of generating average colour data is to reduce the amount of data that must be transmitted from the KVM 14 to the remote computer 20 in the event that all of the pixels in the relevant tile are the same colour. It is common for large contiguous areas of the screen to have the same colour. For example, in text documents, the margin of the document will typically be entirely white. Similarly, in most windows, the edges or borders are a consistent colour.

When all of the pixels of a flagged tile have the same colour, it is unnecessary to send the data associated with all of the pixels in the tile. Rather, the CPU 36 can instead transmit only the coordinates of the tile and its colour. The bandwidth used in transmitting the tile is thus greatly reduced. This reduction in bandwidth results in faster rendering of the screen on the remote computer 20, as there is less data to be processed by the KVM 14 and the remote computer 20.

The last field in the status word is a flag which indicates if the tile is the first tile of the frame. Using this information, the CPU 36 that operates the digital KVM 14 knows when one frame ends and a new frame begins. This information is useful for video alignment and adjustment algorithms described below.

After the flagged tiles are moved to the tile output buffer 32, the FPGA 40 generates an interrupt request to the CPU 36 if at least one changed tile is contained in the tile output buffer 32. Note that, if no pixels have changed from the reference frame to the new frame, no tiles will be resident in the tile output buffer 32. After the interrupt request is sent to the CPU 36, the tile output buffer 32 holds all of the flagged tiles until the CPU 36 extracts them from the tile output buffer 32 for transmission to the remote computer 20.

It will be appreciated that the KVM 14 thus acts as a system for comparing the new video frame from the target computer 12 to the reference video frame. Each new video frame comprises a series of new frame pixels to be captured, the series including initial and final new frame pixels to be captured. The FPGA 40 is programmed to function as a comparison module which receives the new video frame pixels to be captured from the target computer 12 (through the ADC 22), and compares each new video frame pixel to be captured (beginning with the initial one) to the corresponding reference video frame pixel. The FPGA 40 is programmed to read the reference pixels from the buffer 26. The FPGA 40 then saves the new video frame pixel in the buffer 24, which is preferably implemented in the SDRAM 38. The reference frame storage buffer 26 is also preferably implemented in the SDRAM 38, which functions as a memory module. The FPGA 40 then repeats the receiving, comparing and saving steps until the whole new video frame (including the final new frame pixel to be captured) has been compared to the reference video frame and saved in the new frame storage buffer 24. The FPGA 40 is operatively connected to the SDRAM 38 and the ADC 22, thus allowing the new frame pixels to be saved to the buffer 24, reference frame pixels to be read from the buffer 26, and new frame pixels to be received from the ADC 22.

It will be appreciated that the above-described difference calculation method has certain useful characteristics. The first is speed. In the above described preferred method, as each new frame pixel is received by the digital KVM 14, it is compared to the corresponding reference frame pixel immediately, and if the pixel is different, then the title corresponding to the pixel is flagged in the tile difference buffer if that same tile has not already been flagged because of another pixel difference. This process is repeated until the whole new video frame has been received and compared to the reference video frame. The result is that, by the time the new video frame has been completely received, the entire comparison between the new frame and the reference frame is completed. It will be appreciated that such a method represents an improvement in speed over a comparison method in which the new frame is received in its entirety first, and then the pixel-by-pixel comparison between the new frame and the reference frame is performed.

To perform the preferred comparison method described herein, it is preferable for the system components to be fast enough to compare new frame pixels to reference frame pixels at least as fast as the rate at which the new frame pixels are received by the KVM. If the comparison is not done at least that fast, then some new frame pixels will be missed, and will not be compared to their corresponding reference frame pixels. The result would be an inaccurate rendering of the video signal at the remote computer. In software-based KVM systems, it can be difficult to achieve the desired speed. Therefore, it is preferable for the comparison functions to be carried out by the FPGA 40. It will be appreciated that an FPGA has certain advantages. First, because it is programmable, its functionality can be changed relatively easily if desired, particularly as compared with unprogrammable hardware. This includes reprogramming of the FPGA 40 by the CPU 36 during operation, if desired. On the other hand, when in operation, the FPGA acts essentially as hardware; the delays associated with software processing and execution are greatly reduced in the FPGA 40. Because the FPGA 40 is essentially hardware, it operates substantially at the speed of hardware. In summary, through the use of the FPGA 40, the digital KVM achieves at least some of the flexibility and convenience of software, while substantially achieving the operational speed of hardware.

It will be appreciated that, though strongly preferred, the FPGA 40 may be programmed so as to miss some of the pixels of the incoming frame. Such a method is comprehended by the invention. It will be appreciated, however, that in such a case, the series of pixels to be captured would not include missed pixels, but only pixels that the FPGA 40 is programmed to capture.

To accurately identify the screen location of pixels, and of tiles to be transmitted to the remote computer 20, the digital KVM 14 must know the resolution of the incoming video signal from the target computer 12. Most preferably, the KVM 14 will know the number of lines in each video frame, the number of pixels per line, the number of blank lines before and after the V-sync pulse, and the number of pixels in the blanking area on each line before and after the H-sync pulse. To have this information, the KVM 14 will preferably function to determine the resolution of the incoming video signal.

The preferred method for determining when a new stable video resolution is in use is as follows. First, the FPGA 40 detects a stable H-sync pulse. This is accomplished by counting the number of clocks between successive H-sync pulses to ensure that the time between successive H-syncs is the same, within an allowable variance. If so, the H-sync is determined to be stable. Next, a stable V-sync pulse is detected by counting the number of H-sync pulses between successive V-sync pulses. If the V-sync is stable, this indicates that a change to a new resolution has taken place.

As part of the ongoing resolution monitoring, the FPGA 40 monitors the H-sync and V-sync signals to ensure that the duration between successive pulses does not change. If the duration changes, the FPGA 40 ceases video processing and indicates to the CPU 36 that video lock has been lost.

The H-sync and the V-sync pulses do not have strictly standardized durations and positions. However, for a particular video source, and within a particular video resolution, they are consistent. Preferably, the FPGA 40 will be programmed to use its internal clock to measure the duration of the H-sync and the V-sync pulses, the times between the H-sync and the V-sync pulses, the times between the rising edges of successive H-sync pulses, and the number of H-sync signals between rising edges of successive V-sync pulses. Also, the senses of the H-sync and the V-sync pulses can be detected by comparing their active periods with their inactive periods, since by definition their active periods are much shorter than their inactive periods. Using the times between H-sync signals, the line frequency can be determined. Using the time between the V-sync signals, the frame rate is determined. However, the resolution is not yet known, in part because the number of pixels per line is not known. To estimate the number of pixels per line, preferably, the first step is to consult a table of video resolutions stored in the KVM 14 which, using the parameters calculated above provides an estimated number of pixels per line.

The Video Electronics Standards Association (VESA) has issued standards which specify various video resolutions, including the number of pixels per line, the number of lines per frame, the number of blank pixels and lines, and the other parameters. Preferably, these standard resolutions are stored in the table of video resolutions in the NVRAM memory space of the CPU 36. It will be appreciated, however, that the table can be stored in any memory where it would be available to be used to identify the video the video resolution.

In practice, not all possible video resolutions will appear in the table, because the VESA standards are guidelines, not binding requirements. Certain operating systems, such as Linux, maintain their own set of resolutions. In the case of some operating systems, the specifications for the particular resolutions may not be available. However, Linux is an open source system, so its video resolution specifications are available. Preferably, the table will include Linux video resolution specifications, as well as the specifications of any other known video resolutions likely to be in use by the target computer 12.

It will be appreciated that, even if the table contains entries for many different video resolutions, the actual video signal may not match any of the entries in the table. Under such circumstances, the next step is to estimate the video signal resolution. Preferably, the resolution will be estimated using the VESA Generalized Timing Formula (GTF). The GTF is a VESA guideline for estimating an unknown video resolution.

It will be appreciated that, even using the GTF, it cannot be guaranteed that the exact resolution for the incoming video signal has been identified. This is because use of the GTF provides only an estimate of the resolution. However, once the best estimate is made, the parameters can be adjusted and refined using a positioning method described below.

Once the estimate of the video resolution is obtained, the CPU 36 programs the ADC 22 to sample the video and generate a pixel sampling clock. The frequency and timing of the clock are obtained by multiplying the number of pixels per line by the line frequency (i.e. the number of lines per second). The ADC 22 is then programmed to sample the incoming video at the pixel clock rate. Once the ADC-generated pixel clock has stabilized, the sampled video signal from the ADC 22 can be used.

In the event that the video resolution changes, the KVM 14 preferably responds by determining the new video resolution. When a resolution change is detected, the KVM 14 preferably ceases the transmission of video data to the remote computer 20, as any such data will be invalid until the new resolution is determined.

There are some cases where the FPGA 40 will actually not reacquire video resolution even when the syncs change. Under the VESA standards, if the V-sync halts, but the H-sync continues, it means that the target computer's CPU has caused the CRT monitor of the target computer 12 to enter "stand-by" mode. If the H-sync is halted but the V-sync is retained, that indicates that the CPU of the target computer has caused the monitor to enter power-saving mode. In either of these two modes, of course, it is not necessary to automatically reacquire video once the syncs return, because it is not known if the video resolution has changed. Instead, when either of these two modes is detected, the KVM's video processing (i.e. capture and updating) is simply suspended until the syncs return. A message is sent to the CPU 36 by the FPGA 40 indicating that the video screen has entered power saving or stand-by mode. The CPU 36 sends a message to the remote computer 20 that the target video has entered standby or power-saving mode. While the target video is in one of these modes, the remote screen is not updated but is otherwise unaffected.

There is another situation which the FPGA 40 may or may not reacquire video resolution when the syncs change. This situation results from the ADC's susceptibility to noise. If there is a noise spike on the H-sync signal generated by the ADC from the raw H-sync (i.e. the regenerated H-sync), successive regenerated H-sync pulses will be either too close together or too far apart. The pixel sampling clock will also be either too fast or too slow. These changes are not the result of an actual resolution change, but of noise. If the KVM's video capture circuit continues to operate under these conditions, the data it generates will be incorrect, and the remote computer's screen may fill with garbage. However, if a reacquisition of the video signal takes place, then a whole new screen's worth of data will need to be sent to the remote computer 20, though the resolution of the video signal from the target computer may not have actually changed.

Figure 5:
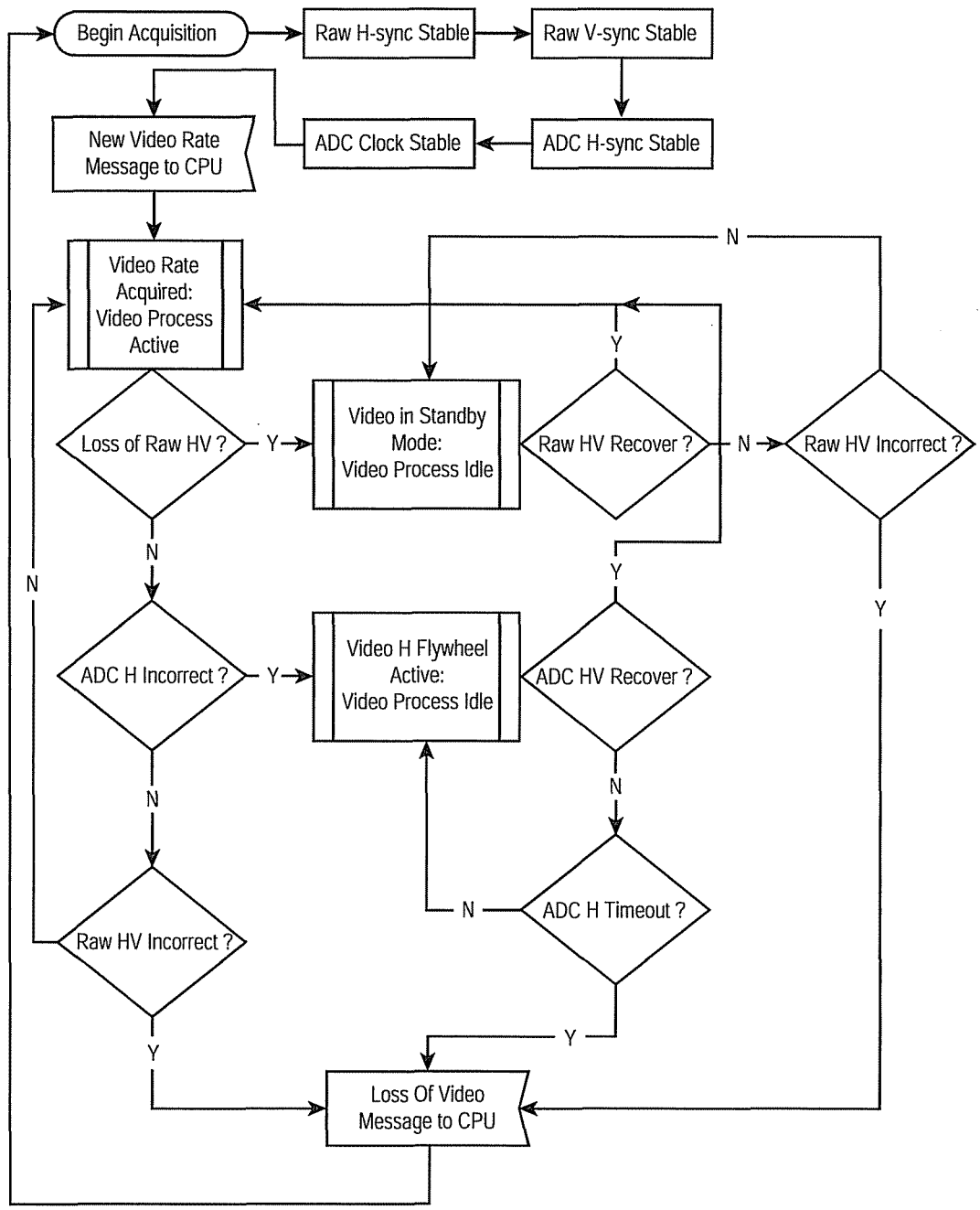
FIG. 5 shows the steps involved in acquiring a video resolution and determining whether to reacquire video resolution according to the present invention.

Thus, this invention preferably includes a method for determining whether to reacquire the video signal from the target computer, illustrated in FIG. 5. The determination, as will be described below, is preferably based on a determination of whether the H-sync has actually changed in a manner that indicates a change of resolution, or whether the change is a product of noise.

As described above, as the video signal is received and converted to digital by the ADC, it is compared with reference video. Then, update data (preferably in the form of tiles containing at least one pixel that has changed) is generated from the comparison for transmission to the remote computer. As the KVM 14 operates, the FPGA 40 continuously monitors two conditions, which preferably are the raw H-sync signal, received directly from the target computer 12, and the regenerated H-sync signal created by the ADC 22 in association with the comparison and update data generation. Both the raw and regenerated H-syncs indicate information about the video signal resolution. If the regenerated H-sync changes so as to indicate a change in the video signal's resolution, but the raw H-sync does not change to indicate a change in the resolution, video capture is suspended, and the FPGA 40 continues to monitor the raw H-sync signal to determine whether to reacquire the video signal. The reason capture is suspended is that the comparison will produce incorrect data anyway, given that the regenerated H-sync has moved out of alignment. On the other hand, the fact that the raw H-sync has not changed suggests that the video resolution has not actually changed, despite the fact that the misalignment of the regenerated H-sync indicates a resolution change.

Next, if the regenerated H-sync continues to indicate a resolution change and the raw H-sync changes so that it also indicates a resolution change, then the KVM 14 determines that the video signal will be reacquired, and reacquisition of the video signal is initiated and completed. If, however, the regenerated H-sync recovers, while the raw H-sync has not changed, then the capture of video is reactivated, because this condition indicates that the regenerated H-sync has returned to proper alignment, and capture can resume without invalid data being transmitted to the remote computer 20.

In addition, preferably, there is a timeout function built into this method. Thus, as explained above, if the raw H-sync has not changed but the regenerated H-sync indicates a resolution change, then capture is suspended and the raw H-sync is monitored. However, the timeout function causes the video resolution to be reacquired if, within a predetermined time (preferably 5 seconds), the regenerated H-sync has not recovered. This reacquisition is initiated regardless if the raw H-sync status. It will be appreciated that, in many if not most cases, the failure of the regenerated H-sync to recover within 5 seconds indicates that there is a problem with the ADC at its current settings. Thus, the regenerated H-sync is unlikely to recover unless the video resolution is reacquired.

It will be appreciated that this method has certain advantages. An important advantage is that unnecessary video reacquisitions are reduced. When video is reacquired, displaying the first new frame requires an entire new screen's worth of data to be sent to the remote computer 20, which unnecessarily strains the resources of the KVM 14 if the resolution did not actually change. In addition, the reacquisition temporarily cuts off video to the remote computer 20. This causes inconvenience to the user of the remote computer 20, so it is preferred that video reacquisition not take place unless it is necessary. Finally, this method reduces the transmission of invalid data by suspending capture until the regenerated H-sync error clears, thus conserving bandwidth.

It will also be appreciated that this method of determining whether to reacquire the video signal can be used with a variety of different video capture methods. It is not limited to use with KVMs that use the preferred capture method described above.

Figure 2:
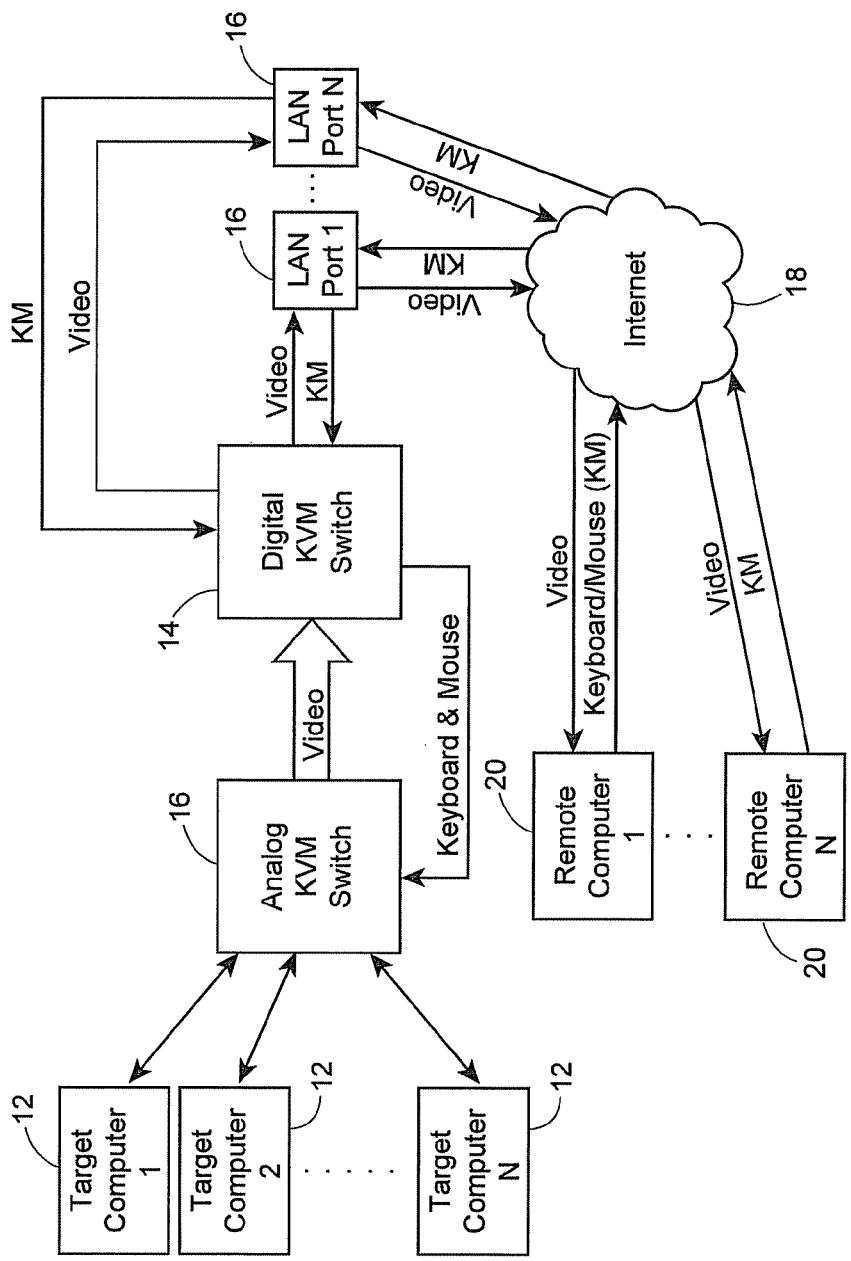
FIG. 2 is a schematic diagram of multiple remote computers, a KVM switch and multiple target computers according to the present invention.

In some embodiments of the invention, the KVM 14 will have more than one remote computer 20 connected to it (see FIG. 2). Such a configuration permits the target computer 12 to be controlled by different remote computers 20. It will be appreciated that, under some circumstances, the ability to control the target computer 12 from a number of different locations could be helpful and convenient for computer maintenance personnel.

In such a configuration, each remote computer 20 has its own connection for receipt of the video information from the KVM 14. These connections are also known as "clients". It will be appreciated that the channels between the KVM 14 and each remote computer 20 as shown in FIG. 2 may have different bandwidths and speeds. As such, when update data is read from the FPGA 40, its transmission to certain remote computers 20 may take longer than its transmission to others.

Figure 6:
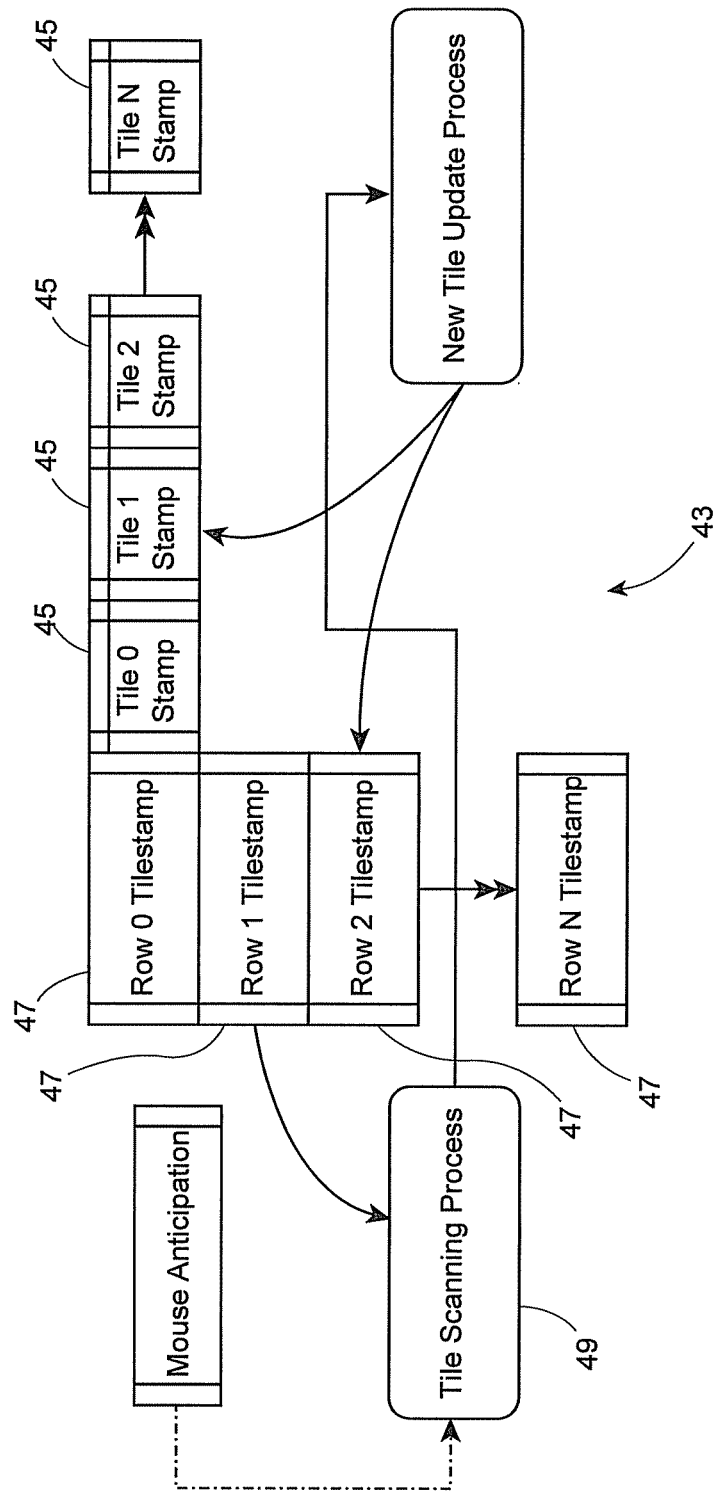
FIG. 6 is a schematic diagram of the tile staleness buffer according to the present invention.

As a result, it is possible for each client's video image to become stale, that is, not an accurate reproduction of the reference image. The KVM 14 preferably includes a tile staleness buffer 43 for each client. The purpose of the time staleness buffer is to minimize video image staleness for each remote computer while adapting the transmission of changed tiles to the speed of the channel to the remote computer. The preferred implementation of the tile staleness buffer 43 is shown schematically in FIG. 6. In the preferred embodiment, the buffer 43 is implemented in the memory space of the CPU 36. However, it will be appreciated that the buffer 43 can be implemented in other ways and still fall within the scope of the invention.

As described above, each time a tile changes in a new video frame, that tile is sent to the FPGA's tile output buffer 32, where it is extracted for transmission to the remote computers 20. The reference frame storage buffer 26 contains the most recent version of each tile received from the tile output buffer 32. Preferably, the reference frame storage buffer 26 also maintains an individual reference buffer tilestamp associated with and corresponding to each tile. These tilestamps are preferably generated by the CPU 36. The individual tilestamps are incremented (i.e. are assigned a value) each time a new version of the corresponding tile is written to the reference frame storage buffer 26. The buffer 26 also preferably maintains a reference buffer row tilestamp corresponding to each row of tiles.

In the preferred embodiment, the row and individual tilestamps of the buffer 26 are incremented by a single counter. Each time a changed tile is read from the FPGA 40, the counter, preferably a 32-bit binary number is incremented by one. For each changed tile read from the FPGA 40, the corresponding individual tilestamp in the buffer 26 is given the value of the counter. The individual tilestamp of the next changed tile comprises that value plus one, the individual tilestamp of the changed tile after that comprises that value plus two, and so on. When the 32-bit counter reaches its maximum, it wraps around to zero and continues incrementing by one for each changed tile read by the FPGA 40. It will be appreciated that the tilestamps can be determined by other means, such as, for example, by having a separate counter for each tilestamp. What is important is that the tilestamps in the buffer be available for use in determining tile staleness.

The purpose of the reference buffer row tilestamps is to indicate the presence of recently updated tiles in the corresponding row. Therefore, in the preferred embodiment, the row tilestamps of the buffer 26 are set to and comprise the value of the tilestamp of the most recently changed tile in the row.

Also, for each client, a tile staleness buffer 43 is maintained. The tile staleness buffer 43 contains an array of individual tilestamps 45. Each individual tilestamp 45 corresponds to a particular tile in the video picture. The buffer 43 further includes a row tilestamp 47 corresponding to each row of tiles in the video picture.

For each client, there is a scanner 49 (preferably comprising a software module in the CPU 36). The scanner continuously scans down each row tilestamp 47 in the staleness buffer 43, comparing it to the corresponding row tilestamp in the reference frame storage buffer 26. For any row where the tilestamps do not match, the scanner scans that row to determine which individual tilestamps do not match. As each of these is found, the scanner 49 causes the current tiles from the reference buffer 26 corresponding to the non-matching tilestamps to be transmitted to the client. Also, the non-matching tilestamps 45 in the tile staleness buffer 43 are updated to match the corresponding tilestamp values in the reference frame storage buffer. Once all of the tilestamps in a particular row have been updated, and the corresponding tiles queued transmitted to the client, the row tilestamp 47 is updated to the value of the corresponding reference buffer row tilestamp.

Each scanner 49 will be programmed to scan at a speed consistent with the speed and bandwidth of the communication channel to the corresponding client. If the channel to a particular client is fast, the scanner 49 will scan through the tilestamps faster, and update tiles will be sent faster. If the channel to a particular client is slow, the scanner 49 will scan through the tilestamps more slowly, and update tiles will be transmitted at a slower rate. Preferably, each scanner 49 will be programmed with a scanning speed adapted to produce the fastest transmission possible on the corresponding channel.

It will be appreciated that, depending on the speed of a particular scanner 49 and its corresponding client communication channel, a tile may be updated more than once in the reference frame storage buffer 26 before it is transmitted to a particular client. The reason is that the channel to the client may be too slow to permit faster transmission. Of course, it is most preferable for all update tiles to be promptly transmitted to the client. However, the speed of a particular channel sometimes renders this unfeasible.

It will be also appreciated that each scanner 49 and buffer 26 functions to insure that the most recent version of each update tile is sent to the client. This results from the fact that the buffer 26 holds the most recently updated version of each time that has been captured. When the scanner 49 reaches a particular tilestamp that does not match the corresponding individual reference buffer tilestamp, the corresponding tile, in its most recently updated form, is transmitted to the remote computer 20 from the buffer 26. This is done regardless of how many times the tile had been updated in the buffer 26 since it was last transmitted to the remote computer.

It will be also appreciated that, at the remote computer's end of a slow or low bandwidth channel, the motion on the video screen will often appear jerky because the screen is updated slowly, and some updates are missed. The remote computer's screen may be updated relatively slowly and infrequently. However, by ensuring that only the most recent versions of tiles are transmitted, the time between when inputs (such as keyboard and mouse) are made at the remote computer 20, and when they appear on the remote screen, is minimized. This reduction in input response time improves the usability of the remote computer 20. By contrast, if all versions of the tiles were queued and eventually sent, input response time would increase to the detriment of usability.

It will be appreciated that one of the factors that increases usability for a user of the remote computer 20 is seeing inputs (such as keyboard and mouse inputs) reflected promptly on the screen. Thus, when the remote user moves his mouse, ideally, the mouse will move promptly on the screen. This result, however, can be difficult to achieve, because the mouse signal has to travel from the remote computer 20 to the target computer 12, whose video signal gets updated. The video signal then has to travel to the KVM 14, get processed, and the relevant update data has to be sent to the remote computer 20, at which time the mouse movement appears on the remote computer screen. When there is a fast, high-bandwidth connection between the KVM 14 and remote computer 20, the appearance of mouse movement on the remote screen will be reasonably prompt. However, in low-bandwidth conditions, there may be a large time lag between when the mouse is moved and when the movement shows up on the remote screen.

For this reason, the KVM 14 preferably includes a mouse anticipation algorithm. The KVM 14 maintains in the CPU 36 a representation of the absolute position of the mouse on the remote screen. This is the initial position of the mouse before a mouse movement takes place. When the remote user moves the mouse, the video signal from the target reaches the KVM 14, indicating that the mouse has moved, and the representation is updated to reflect the movement.

The CPU 36 is programmed to cause the tile staleness buffer's tile scanner 49 to jump to the start of the row of the tile(s) containing the old position once these tiles have been extracted by the CPU 36 from the tile output buffer 32. These tiles are scanned and the relevant ones are updated to reflect the fact that the mouse has moved, and the updated tiles are queued for transmission. The scanner 49 moves to the row(s) of tiles containing the anticipated mouse position. These row(s) are scanned and updated, with the changed tile or tiles being queued for transmission. Once these steps are completed, the scanner returns to its initial position i.e. the position it was at before jumping in response to the change of mouse position.

In this way, when an indication is received that the mouse has moved, the preprogrammed updating sequence by which the scanner 49 updates the remote computer's video is interrupted. The video of the remote computer 20 is updated to reflect the mouse movement, and the preprogrammed sequence of the scanner 49 is resumed.

It will be appreciated that, because a mouse movement causes the relevant tiles to be immediately updated, this feature has the effect of giving mouse movements higher priority in the update sequence than other types of video signal changes. In other words, when a mouse movement occurs, the remote computer's video screen is updated to reflect the mouse movements before other pending updates are made even if those other pending updates would otherwise have been made sooner. The result is that mouse movements appear on the remote screen faster than they would without the increase in priority. This beneficial effect is more pronounced for remote computers connected to the KVM 14 by low bandwidth connections.

As explained above, standard video modes (such as the VESA standard modes) define the number of pixels for each line, and the number of pixels between each H-sync pulse and the active video region. Similarly, standard video modes define the number of lines between the V-sync and the active video region. Therefore, if such a standard video mode is in use, the active video portion can be positioned accurately, so that it fills the entire screen but does not extend beyond the screen. (In this context, "active video region" means the portion of the frame that is intended to appear on the screen and be seen by a user. The part of the screen outside the active video region is typically referred to as the "blanking" portion of the screen.)

However, also as described above, in some cases, the video signal being received from the target computer 12 by the KVM 14 cannot be conclusively matched with any of the standard video resolutions/modes in the table. Under these circumstances, the GTF is used to estimate various aspects of the video resolution, including the number of pixels between the H-sync and the active video region, and the number of lines between the V-sync and the active video region. However, the GTF only provides an estimate of the size of the active video region, and the estimate may be wrong. In addition, even when the correct video resolution is known from the table, position of the H-sync relative to the screen pixels may get shifted as the video signal travels through circuitry such as the analog KVM switch 16. Therefore, in one aspect, the present invention preferably includes a video centering method i.e. a method for properly positioning the video frame on the screen.

Typically, video signals use the colour black in the blanking portion of the frame. By contrast, the active video region will usually include some non-black pixels. Thus, as a first approximation, the CPU 36 programs the FPGA 40 to place the first non-black pixel (i.e. the non-black pixel closest to the top of the frame) at the top left corner of the screen. In other words, the first non-black pixel is assumed, as a first approximation, to be the first pixel of the active video region. It will be appreciated that, since part of the active video region of the current frame could be black, this first approximation is not necessarily correct.

After the first approximation, the KVM 14 enters an iterative mode, where the approximation is adjusted to a progressively more precise estimate of the location of the active video region. As each new frame is received, the KVM 14 measures the black areas along all four edges of the frame. If there are black areas along the top and the bottom of the frame, then the CPU 36 programs the FPGA 40 to adjust the vertical position of the estimated active video region (i.e. the region of the frame between the two black strips on the top and bottom, and between the two black strips along the right and left sides) so as to equalize the black strips along the top and bottom of the frame. If the total black area on the top and bottom is an odd number of lines, the estimated active video region is positioned so that the one extra line will be located along the bottom. Similarly, if there are black strips along the right and left sides of the frame, the CPU 36 programs the FPGA 40 to adjust the horizontal position of the estimated active video region so as to equalize the black strips along the right and left of the frame. If the total black area on the right and left is an odd number of pixels, the estimated active video region is positioned so that the one extra pixel will be located along the right.

Also, the CPU 36 will only adjust the position of the estimated active video region if the black area on the left or right, or on the top and bottom, decreases from one iteration to the next. If the amount of black area on the left and right, or top and bottom, increases, the CPU 36 treats the increase as if the black area has remained unchanged. The reason for this is that, if the black area on the frame edges increases from one iteration to the next, it means that some of the edge area that is currently black previously included non-black pixels. Assuming that the blanking portion of the frame is black, any area that previously had non-black pixels must be part of the active video region. Therefore, if the black edge area increases, it is assumed that the extra black area that appeared in the last iteration is not part of the blanking portion, and that the position of the frame does not need to be adjusted.

In the preferred embodiment, the iterative mode will continue operating until there is a video resolution change in the target computer's video signal. When such a resolution change takes place, the KVM 14 reacquires the video signal and then restarts the video centering method just described.

In another aspect of the invention, the KVM 14 preferably executes certain video tuning methods or algorithms described below. It will be appreciated that when the video signal is received in analog form by the ADC 22, the ADC should ideally sample the video signal at the points on the signal that are most likely to accurately represent the colour of the pixel. The incoming analog video signal represents a series of pixels. At the borders between the pixels, the signal shifts in order to establish itself at the voltage value corresponding to the next pixel. The time allotted for each pixel is generally constant for each particular video resolution. Thus, ideally, the video signal will be sampled in the middle of the time allotted for each pixel. This allows the ADC 22 to determine the correct analog signal voltage corresponding to the relevant pixel, and to convert that voltage to a digital value representing the pixel's colour.

Figure 7:
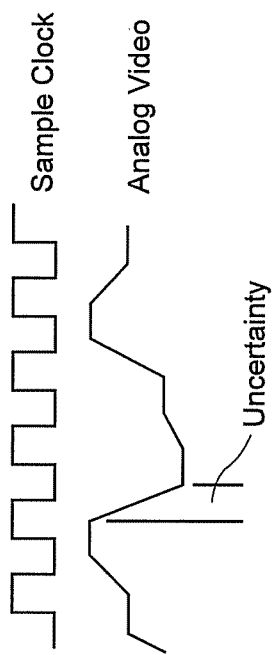
FIG. 7 is a diagram showing a properly phase-adjusted sampling clock.

Thus, ideally, the ADC's sampling clock will cause the ADC 22 to sample at the correct points. Such a scenario is illustrated in FIG. 7. In this figure, the sampling clock's waveform is shown. In this example, sampling takes place on the clock's rising edge. The incoming analog video waveform is also shown. The sampling clock's rising edges line up with the mid-point of the time allotted for each pixel. In the example given, the analog waveform is flat at the point of sampling.

Figure 8:
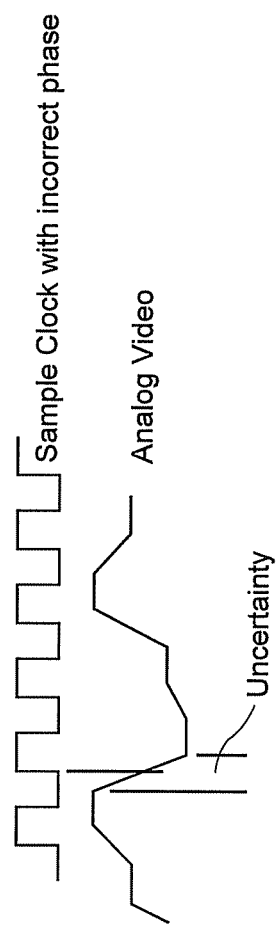
FIG. 8 is a diagram showing an improperly phase-adjusted sampling clock.

FIG. 8 illustrates a scenario in which the sampling takes place at the edges of the times allotted for each pixel. These edge periods are periods of uncertainty in the analog video signal, during which the signal is switching from the value representing the previous pixel to the value representing the next pixel. Sampling at these points in the signal has negative consequences. First, the sampled value is likely to be unrepresentative of the pixel, because, in many cases, by the time the sampling takes place, the signal has started to shift to a new value, or, looked at differently, has not reached its new value. Also, sampling at the point of uncertainty causes pixel dither. Pixel dither occurs when a pixel shifts in colour on the remote screen between frames, even though the intended colour of the pixel has not changed. When sampling takes place in the uncertainty range as shown in FIG. 8, pixels on the remote screen will dither between different values even when the pixel value as generated by the target computer has not changed, because the uncertainty will cause randomness in the actual sampled value at the ADC 22.

It will be appreciated that pixel dither has some negative consequences. One of these is blurry video at the remote computer, which is the visual effect that results from pixels dithering back and forth between different colours. Another is excessive data generation. As described above, the KVM 14 receives each new frame of video, determines the differences from the previous frame, and transmits to the remote computer all tiles containing pixels that have changed. If pixel dither is present, many tiles will appear to have pixels within them that have changed, even though the intended value of these pixels has not changed. The result is a much heavier data processing and transmission load being borne by the KVM 14.

Therefore, the present invention preferably includes a method or algorithm for properly aligning the sampling clock so that the video signal is sampled at or near the middle of the time allotted for each pixel rather than at or near the edge of the time allotted for each pixel. One possible such method operates on the basis that if pixel differences are minimized, that indicates a minimization of pixel dither, which in turn indicates that the pixel clock is properly aligned. The method is preferably executed by the KVM 14 each time the video resolution changes.

To determine the optimum phase shift for the sampling clock relative to the video signal, the ADC 22 is adjusted by the CPU 36 to different phase settings. For each setting, the difference counter 31 of FPGA 40 counts the number of pixel differences from one pixel to the next. Preferably, the differences will be counted over several frames, to give the ADC sampling clock time to settle on the new phase setting. The CPU 36 then averages the total difference count over the several frames. This is repeated over different clock phase settings until the lowest difference count is found. It is assumed that at the phase setting resulting in the lowest difference count, pixel jitter is minimized, and the phase setting is optimized.

Typically the ADC will have 32 different phase settings. One way to find the optimum phase is to try each setting in turn, and then choose the setting that generated the lowest difference count. However, it will be appreciated that trying each of the 32 settings is not preferred, because doing so takes longer than is necessary to settle on the optimum phase setting, and because going through all 32 settings creates a lot of unnecessary bandwidth usage as pixel differences are calculated and transmitted for each of the 32 settings.

Therefore, the optimum setting will preferably be found by initially trying every fourth setting of the ADC 22. This requires at most eight trials. Then, the three settings are tried that are located between the two settings of the first eight trials that resulted in the lowest difference counts. The setting, selected from these 11, that yielded the lowest number of pixel differences is selected as the optimum phase setting.

This method requires trying at most eleven phase settings. It will be appreciated that this approach reduces the bandwidth used in finding the optimum phase setting. As a result, pixel dither and the blurry screen images that result are reduced more quickly.

Although the above method is useful for finding the correct phase setting for the ADC sampling clock, it is not the preferred method. Rather, the preferred method operates on the basis that for any particular screen content, there will be a greater average change from one sampled pixel to the next if the sampling is done at the middle of the allotted time for each pixel than if the sampling is done at the edges. In other words, for an entire frame, the aggregate of the absolute value of the changes in digital values between pixels will be maximized if sampling is done at the middle of the allotted time for each pixel. This is illustrated at FIG. 11. FIG. 11 shows an analog waveform corresponding to a frame made up of alternating black and white pixels. The black pixels are represented by the low portions of the waveform, and the white pixels by the high portions.

For example, when eight-bit colour is being used, and the black pixels are sampled at the middle of their allotted time, the sampling will produce a digital value of zero after the analog-to-digital conversion is completed. Similarly, if the white pixels are sampled at the middle of their allotted time, the sampling will produce a digital value of 255 after the analog-to-digital conversion is completed. Thus, the absolute value of the change from each pixel to the next in this alternating black-white frame is 255.

However, if the analog waveform is sampled during its transition period, the results will be different. During the transition period, the analog waveform has already begun moving from the digital value for one pixel to the digital value for the next pixel. Thus, when the sampled voltage is converted to digital, the digital value will be neither zero nor 255, but some value in between. Furthermore, the absolute value of the change from one pixel to the next will be less than 255. In theory, if the sampling takes place in the middle of the transition period, the digital value of each sample will be the same, even though the pixels are alternating between black and white.

Therefore, a more preferred method for determining the proper phase setting for the ADC sampling clock is to find the setting where the aggregate absolute value of digital value changes between pixels, for an entire frame, is maximized. It will be appreciated, however, that even if the pixel is not sampled at the middle of the allotted time, the total changes in digital value from one pixel to the next may be maximized, as long as the sampling takes place well outside the transition periods of the analog waveform. In other words, there may be several phase settings for the sampling clock of the ADC 22 which maximize the aggregate digital value changes between pixels for a whole frame. Some of these phase settings may not cause sampling to take place at the middle of the allotted time for each pixel.

Therefore, the most preferred method for finding the best phase setting for the sample clock is to find the setting that minimizes the aggregate absolute value of digital value changes between pixels, for an entire frame, and then to set the sampling clock's phase at the opposite setting, i.e. the setting that is 180 degrees different. As explained above with respect to the waveform shown in FIG. 11, in theory, sampling at the middle of the transition between pixels will minimize the changes in digital value between one sample and the next. The middle of the transition period is 180 degrees away from the middle of the time allotted for each pixel. Therefore, by finding the phase setting that minimizes the changes in digital value, and by setting the phase 180 degrees away, the clock is set to sample at the middle of the time allotted for each pixel. It has been found that, even when the incoming video signal is not alternating black and white as in FIG. 11, the total amount of change between pixels tends to be minimized when sampling is done at the middle of the transition areas.

Thus, most preferably, the method for determining the phase of the ADC sampling clock is as follows: The phase settings of the ADC are moved from one setting to the next. For each setting, a number of pixels (preferably a frame's worth) are sampled and converted to digital values. For the entire number of pixels, the absolute value of the digital-value-change from each pixel to the next is calculated and summed over the whole number of pixels. A first phase setting that minimizes this sum is identified, and a second phase setting that is exactly 180 degrees away from the first phase setting is identified. The ADC sampling clock is set to the second phase setting. It will be appreciated that, though unlikely, it is possible that the ADC 22 will have no second phase setting that is 180 degrees from the first, due to the limited number of actual phase settings implemented in the ADC 22. If this is the case, then the second phase setting will be the phase setting that is closest to being 180 degrees out of phase with the first phase setting.

It will be appreciated that the most preferred method just described is most preferred in part because it has been found to be effective in properly adjusting the phase of the ADC sampling clock. It has also bee found that the efficacy of the method is not unduly dependent of noise values within the ADC 22 and on the video signal coming from the target computer.

It will be appreciated that this method may be executed in the CPU 36 or the FPGA 40. Using the FPGA 40, the calculation of the sums can be completed more quickly. However, the execution time of this method is dependent not only on these calculations, but also on time it takes for the ADC 22 to switch from one phase setting to the next. To reduce the total time taken for changing phase settings, it is possible to use only a subset of the ADC's available phase settings in executing the method, rather than all of them. However, it will be appreciated that using all of the phase settings for the phase adjustment algorithm maximizes the likelihood of finding the optimal phase setting.

Most preferably, while the phase adjustment method is being executed, only average colour for each changed tile is sent, rather than all of the pixels for each tile. The reason is that, while the phase adjustment method is being executed, a substantial proportion of the frames (primarily those where the sampling is done at the worst phase settings) be received inaccurately because of the poor phase setting. Thus, there is little benefit to sending full pixel data for the changed tile. Once the phase is adjusted, the full data for the changed tiles is sent.

It will be appreciated that this most preferred phase adjustment algorithm works best with screen content that includes high frequency matter i.e. matter where there is rapid change between digital values between pixels. The test pattern 60 described below is an example of such matter. Text is another, more common example of such high frequency matter, because with text, there has to be a substantial contrast between the text itself and the background. It will also be appreciated, however, that it is not necessary for the screen to be filled with high frequency matter such as text. A relatively small amount of text will be sufficient for the execution of this method.

It has been found that this method will generally produce good results, even if the video screen content changes from one frame to the next. However, although a fully stable picture is not necessary, the method works best if there are not major changes in the video from one frame to the next while the method is being executed.

In addition to determining the correct phase shift for the sampling clock, there are other settings of the ADC 22 that are relevant to the quality of the video displayed at the remote computer 20. These include the gain and offset of the ADC 22. Adjusting the gain changes the maximum and minimum values of the signal presented to the ADC's sampling circuit. Thus, for example, a signal initially varying in voltage between 0 and 1 volt will vary between 0 and 2 volts if it has a gain of two applied to it prior to entering the sampling circuit.

The offset adjustment does not affect the size of the voltage range of the incoming signal. Rather, offset affects the location of the boundaries of the voltage range. Thus, for example, a signal varying between zero and one volt which goes through an offset of negative 0.5 volts will then vary between negative 0.5 and 0.5 volts. It will be appreciated by those skilled in the art that adjusting the gain of the signal affects its offset, but changing the offset of a signal does not affect its gain.

Preferably, the KVM 14 will have stored in the CPU's non-volatile memory optimum settings for the gain and offset. These settings are determined by using the test pattern 60 shown in FIG. 9 (described below), and a factory reference video source. Preferably, the KVM 14 is configured to allow a user to revert to these settings at any time. It will be appreciated, however, that under some circumstances the gain and offset may need to be adjusted. For example, the appropriate gain and offset may need to be adjusted in response to the specific characteristics of the ADC 22, the length of the cable leading from the target 12 to the KVM 14, and the characteristics of the circuit in the target 12 that generates the video signal. The appropriate gain may also be affected by the specific video resolution in use.

Preferably, the KVM is configured to allow the user to create and store optimum gain, offset and phase settings for each one of a variety of sets of circumstances, such as, for example, different video resolutions. Preferably, this is done using the test pattern 60 shown in FIG. 9 as described below.

Figure 9:
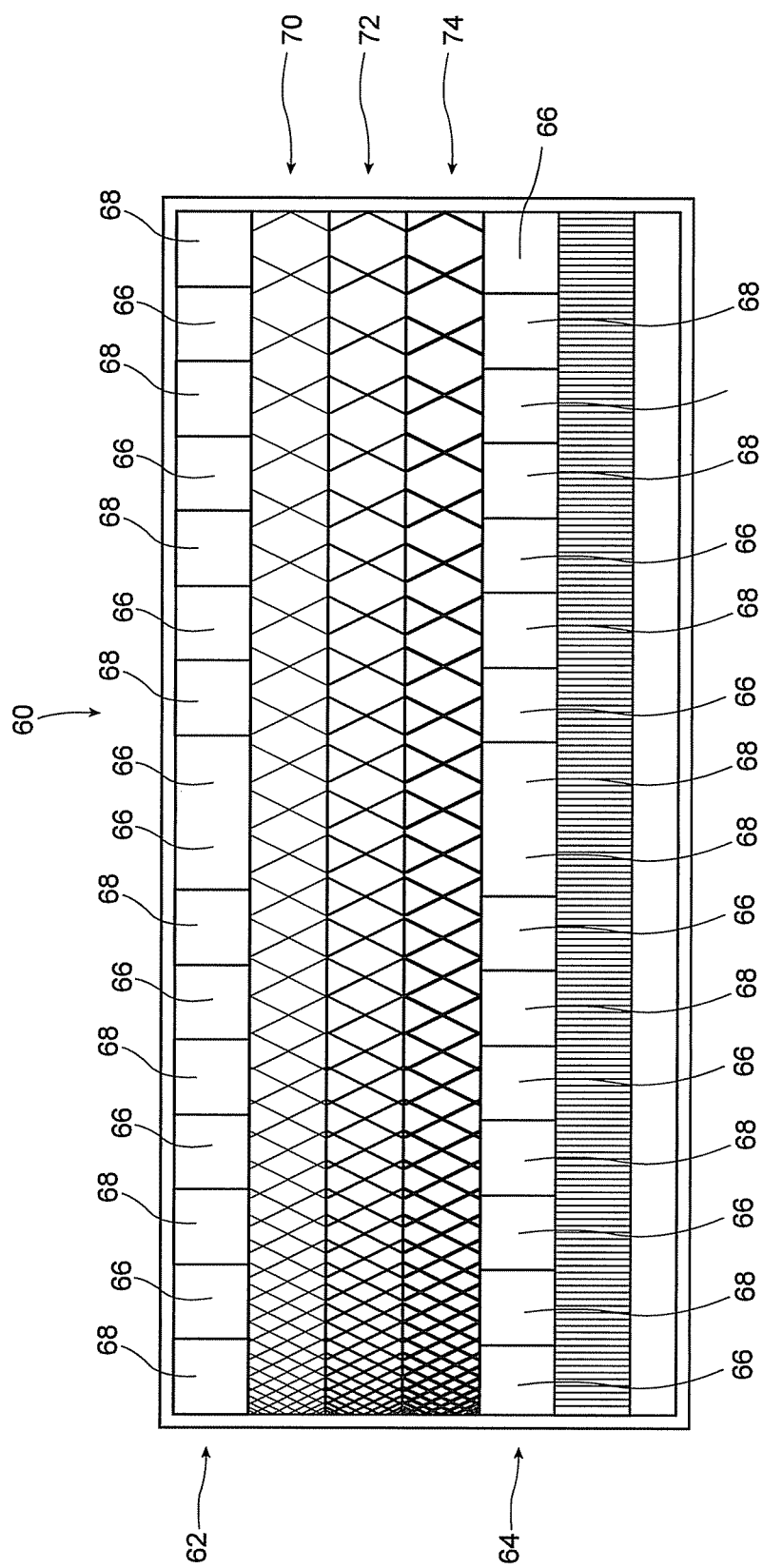
FIG. 9 shows a test pattern according to the present invention.
Figure 10:
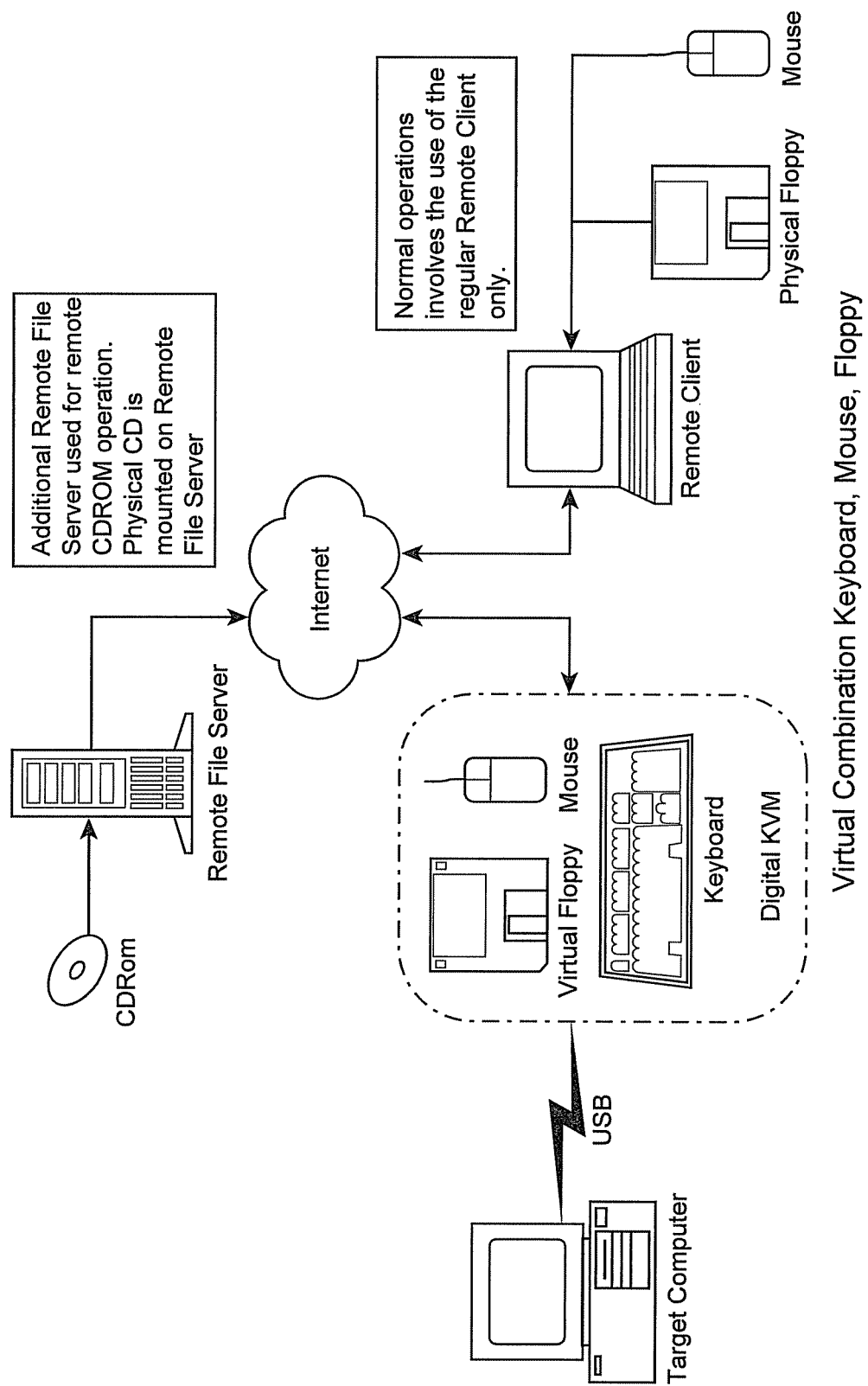
FIG. 10 is a schematic diagram of the virtual keyboard, mouse and floppy according to the present invention.

The preferred test pattern 60 shown at FIG. 9 provides a known colour reference for use in calibrating gain and offset. It consists of an upper portion 62 and a lower portion 64. Each includes alternating black squares 66 and white squares 68. In between the upper portion 62 and the lower portion 64 is located a colour gradient in the form of a red strip 70, a green strip 72 and a blue strip 74. Each of the strips gradually increases in brightness from black on the left (value 0) to the brightest level of the colour on the right (value 255), which for the purposes of this specification will be called "white". Throughout each strip, each value of the colour is three pixels wide (assuming 8 bits per colour).

Each square 66 or 68 in the upper and lower portions 62, 64 is three tiles high and three tiles wide, so that each square encapsulates at least one full tile regardless of where the pattern 60 is positioned on the screen. The black and white squares 66, 68 are configured and positioned so that the encapsulated tiles form a distinct sequence, or registration mark. The registration mark is used by the CPU 36 to locate the search pattern as it searches for the pattern 60 on the screen. Once located, the CPU 36 can locate the first pixel of the colour gradient portion of the pattern.

It will be appreciated that, for each colour, the test pattern 60 contains the full range of values available, which corresponds to the full range of video signal values coming from the target computer 12. Thus, adjusting the offset will cause the middle value for each colour to move to the right if the offset is adjusted upward and to the left if it is adjusted downward. The optimum offset is the one that causes the middle value of each colour to be located precisely in the middle of the screen. This is because, by definition, the optimum offset is the offset value at which the middle of the voltage range precisely matches the middle of the range of values for each colour. The pattern 60 is configured so that the colour values are centred when the offset is optimized. Thus, the CPU 36 adjusts the ADC's offset and searches the pattern 60 until the offset that precisely centres the middle colour values is found. That is the optimum offset.

Next, the gain is adjusted. Because the test pattern 60 contains the full range of values available for each colour, the optimum gain is the gain at which the strips 70, 72 and 74 extend all the way across the screen, but do not extend past the screen edges. At the optimum gain, when each colour has eight bits, the first three pixels at the left of each strip will be black, and the last three on the right will be white. When four bits per colour are used, as is the case in some embodiments, the first 48 pixels on the left will be black, and the last 48 on the right will be white. Thus, the CPU 36 determines, based on the number of bits being used for colour, whether the gain is optimum, by determining the position of the first non-black and last non-white pixels in each strip 70, 72, and 74. If the first non-black pixels and last non-white pixels are positioned at the correct minimum distance from the edges of the screen, then the gain is optimized. If not, the CPU 36 adjusts the gain until it is optimized. It will be appreciated that the pattern 60 is configured and sized such that the pattern 60 will be correctly positioned on the screen when the gain is optimized.

Since the adjustment of gain affects the offset, the offset must be checked again to determine if it is optimized. If it's not, the offset and gain must be adjusted again iteratively until the offset is checked after a gain adjustment and found to be optimized. It has been found that within three iterations, the offset and gain have usually converged to their optimum points.

It will be appreciated that, with four-bit colour, there will be a banding effect on the strips 70, 72, and 74. These results from the same range of colour being represented with fewer digital values. One result of binning is uncertainty at the edges of the bins, where the precise border between the values is uncertain. Thus, in determining the correct gain and offset, the CPU 36 averages over the area of uncertainty to determine the location where one colour value changes to the next. This is necessary to permit the CPU 36 to determine where the first non-black and last non-white pixels are located.

As explained above, software updates and upgrades are tasks commonly performed by server maintenance personnel. Historically, software upgrades and updates have had to be done locally at the target computer 12. The person doing the upgrade would sit at the target computer, insert the floppy disk or CDROM containing the upgrade, change the CDROM or floppy if necessary, wait for the upgrade to be completed, and reboot the computer if necessary. It will be appreciated that this process for doing software upgrades can be very tedious and time consuming, particularly if there are many servers in the network that require upgrades, and if the servers are not conveniently located for maintenance personnel.

Therefore, the KVM 14 preferably includes a system and method for facilitating software upgrading of the target computer 12 from the remote computer 20. Preferably, the CPU 36 is programmed so as to present to the remote computer 20 a memory device comprising memory space associated with the KVM 14, preferably in the form of virtual floppy disk drive or other virtual memory disk device. The amount of memory available in the virtual memory disk to be inserted in the virtual drive depends on the amount of free memory in the CPU 36 and SDRAM 38. The memory space is preferably contiguous but may be non-contiguous.

To perform a software or other upgrade, the user of the remote computer 20 transfers the relevant software or other data on to the virtual disk of the KVM 14. The user then "inserts" the virtual disk into the virtual drive i.e. the user causes the memory space of the virtual floppy to be accessible to the target computer 12. In other words, the virtual memory disk drive containing the disk is thus mounted to the target computer 12. Preferably, the virtual floppy is connected via the USB (Universal Serial Bus) protocol to the target computer 12. Once this is done, the target computer 12, because of the nature of the USB protocol, recognizes that a new device having file capability has been added. To perform the software upgrade, the remote user, through his control of the target computer 12, causes the target computer to accept the software update from the virtual floppy in much the same way that it would be accepted from a local, physical floppy. The remote user can then cause the target computer to "eject" the floppy. The disk is thus unmounted from the target computer 12 and remounted to the remote computer 10, which gives the remote user access to it for further upgrades, if desired.

Preferably, the virtual floppy disk is connected to the target computer via a USB connection.

As will be appreciated by those skilled in the art, actual floppy disks must typically be formatted prior to use. Formatting, inter alia, divides the memory space of the floppy disk into sectors. The data subsequently placed on the disk can then be located according to its track and sector. Actual disks used for booting computers have the boot data at particular locations on the disk.

It will be appreciated that one of the tasks sometimes required of maintenance personnel is the rebooting of the target computer 12, either because the target computer has crashed, or because rebooting may be necessary after a software upgrade. Some target computers 12 may be unable to reboot from an arbitrarily sized and formatted memory device, but must be booted from a memory device that is an actual floppy, or configured as an actual floppy. Thus, preferably, the virtual floppy will be configurable like an actual floppy. The virtual floppy will preferably be sized as an actual floppy, and will preferably have the same system of memory segmentation i.e. be formattable into sectors like an actual floppy. So, for example, the virtual floppy of the present invention preferably be sizable at 1.44 megabytes to mimic a comparable actual floppy, and will preferably be formattable into sectors so as to mimic an actual 1.44 megabyte floppy.

With some target computers, when booting takes places, the target computer 12 is programmed to check at a particular location on the boot disk for the boot commands and data. If the boot commands and data are not found at that location, such a target computer 12 will not boot. To increase the likelihood that the target computer 12 will be able to boot from the floppy, the KVM 14 is preferably configured to permit an image of an actual boot floppy to be downloaded onto the virtual floppy. Downloading such an image involves copying the actual floppy byte for byte into the virtual floppy, with each byte of data from a particular location on the actual floppy being saved at the same location on the virtual floppy. The result is that, when the target computer 12 checks the virtual floppy for boot commands and data at a particular location on the virtual floppy, it will find them at the expected location and boot accordingly.

Preferably, the KVM 14 will also be configurable to operate in RAMDisk mode. Thus, rather than presenting to the target computer 12 the preferred virtual floppy as described above, the RAMDisk need not be a particular size or format. However, the RAMDisk, like the virtual floppy, can be used to transfer data, such as software upgrades, to the target computer 12. The RAMDisk, like the virtual floppy, will typically comprise available memory from the CPU 36 or SDRAM 38.

As another alternative, which can be implemented with or without the virtual floppy and/or the RAMDisk, the KVM 14 will be configured to present a bootable CDROM to the target computer. While a virtual floppy can be emulated within the memory space of the KVM 14 (either in the CPU's memory or the SDRAM's), as described above, a CDROM contains too much memory to be emulated in the memory space of the KVM 14. Thus, in the preferred embodiment, the CDROM image presented to the target computer is contained on a separate file server connected to the KVM 14 via the internet. The KVM 14 is configured to permit data from a CDROM on the remote computer 20 to be downloaded, via the KVM 14 and the internet 18, to the file server which contains the virtual CDROM. Once the data is downloaded, the KVM 14 is configured to permit the remote computer 20 to mount the virtual CDROM, that is, make the virtual CDROM available for use by the target computer 12. Once the virtual CDROM is mounted, the target computer 12 (which is under the control of the remote computer 20) can download software updates, boot data or other data from the virtual CDROM via the internet 18 and the KVM 14. Once the virtual CDROM has been used to update, boot or otherwise transfer data to the target computer 12, the target computer 12 (which is being controlled by the remote computer 20), unmounts the virtual CDROM. Thus, the virtual CDROM is no longer available to the target computer 12, but is now available to the remote computer 20 so that the remote computer 20 can download new data or a new CDROM image to the file server for use on the target computer.

It will be appreciated that most keyboards and mice operate using the PS/2 protocol. Under PS/2, the information protocols are different for keyboard and for mouse, so separate connections are required for each. With respect to the KVM 14, if the keyboard and mouse of the remote computer 20 operate under PS/2, then a separate connection is required between each of the remote keyboard and mouse and the KVM 14. Preferably, however, the KVM 14 further includes a USB keyboard and mouse connection between the KVM 14 and the target computer 12. The PS/2 events that are received by the KVM 14 from the remote computer 20 are translated to USB events for transmission to the target computer 12.

It will be appreciated that the use of the USB protocol for transmitting keyboard and mouse data has certain advantages. First, in general, the USB protocol involves less translation of information at the target computer 12 than the use of the PS/2 protocol. Therefore, the USB connection is more reliable because translation errors are less likely.

Second, under the PS/2 protocol, mouse movements are represented as relative movements. In other words, under the PS/2 protocol, when the mouse moves, the information sent is simply that the mouse has move a certain horizontal and a certain vertical distance from its original position. The actual, absolute position to which the mouse has moved is not provided. The result is that, under the PS/2 protocol, if the representation of the original position of the mouse before the movement has been corrupted, then the representation of the mouse position after the movement will also be inaccurate. By contrast, the USB protocol allows the mouse movement to be communicated by simply transmitting the new absolute position of the mouse after the movement. This allows a greater accuracy in the representation of the mouse position. It also permits the new mouse position to be more quickly and efficiently incorporated into the video signal of the target computer 12. Once the mouse movement is reflected in the video signal of the target computer, the mouse anticipation algorithm described above will operate.

Third, the USB protocol allows for a single connection between the KVM 14 and the target computer 12, which carries both the keyboard and mouse information. This is in contrast with the PS/2 protocol, which requires a connection for each of the keyboard and mouse.

While the foregoing embodiments of the present invention have been set forth in considerable detail for the purpose of making a complete disclosure of the invention, it will be apparent to those skilled in the art that various modifications can be made to the device without departing from the broad scope of the invention as defined in the attached claims. Some of these variations are discussed above and others will be apparent to those skilled in the art. For example, though preferred, the comparison module need not comprise an FPGA 40 to fall within the scope of the invention. Rather, the functions of the CPU 36 and the FPGA 40 can be implemented in software, hardware or combinations thereof and still be comprehended by the invention. Similarly, the memory hardware and functions described herein can be implemented in any functionally suitable manner and be comprehended by the invention. Other methods, besides the preferred ones described, may be used to address problems of tile staleness, video resolution detection, and excessive bandwidth usage. As another example, the invention comprehends monitoring other signals besides the raw and regenerated H-sync to determine whether to reacquire the video signal. Thus, for example, monitoring the raw and regenerated V-syncs is possible, though not preferred.

What is claimed is:

1. A device for permitting control of a target computer by a remote computer, wherein the device comprises a programmable KVM switch that includes a CPU and that is operatively connectable to the remote computer so as to receive remote computer mouse and keyboard signals and transmit video update data to the remote computer, the switch further being operatively connectable to the target computer so as to provide the remote computer keyboard and mouse signals as control inputs to the target computer and so as to receive a target computer video signal for generation of video update data, the switch including a virtual memory disk, the virtual memory disk comprising a memory space associated with the switch, the switch being programmed to permit a user of the remote computer to:

mount the memory space to the remote computer, transfer data to the memory space, and unmount the memory space, the switch further being programmed to permit the user, by controlling the target computer through the remote computer, to mount the memory space to the target computer, transfer the data to the target computer, and unmount the memory space from the target computer.

2. The device of claim 1, wherein the memory space is configured so as to mimic the size and memory format of a bootable floppy disk, and so as to permit the target computer to reboot from the memory space.

3. The device of claim 2, wherein the switch is programmed to permit an image of the bootable floppy disk to be downloaded into the memory space, such that each byte from the bootable floppy disk is saved at the corresponding byte location of the memory space.

4. The device of claim 2, wherein the switch is configured so as to connect the memory space to the target computer via a USB connection.

5. The device of claim 1, wherein the memory space comprises a virtual CD-ROM residing on a server operatively connected to the device.

6. The device of claim 5, wherein the switch is programmed and the virtual CDROM configured, to present a bootable CD-ROM to the target computer.

7. The system of claim 1, wherein the memory space comprises a virtual CD-ROM residing on a server operatively connected to the switch.

8. A method of transferring data from a remote computer to a target computer, wherein the remote computer and target computer are each operatively connected to a KVM device to permit control of the target computer by the remote computer, the method comprising the steps of:
  (i) causing data to be transferred from the remote computer to a memory space associated with the KVM device;
  (ii) causing the remote computer to unmount the memory space from the remote computer, so that the memory space is inaccessible to the remote computer;
  (iii) using the remote computer to cause the target computer to mount the memory space to the target computer, so that the memory space is accessible to the target computer; and
  (iv) using the remote computer to cause the target computer to transfer the data from the memory space to the target computer.

9. A method as claimed in claim 8, wherein the method comprises the step of, prior to step (i), causing the remote computer to mount the memory space to the remote computer so that the memory space is accessible to the remote computer.

10. A method as claimed in claim 8, wherein the memory space is configured so as to mimic the size and memory format of a bootable floppy disk, and so as to permit the target computer to reboot from the memory space.

11. A method as claimed in claim 10, wherein the method further comprises the step of downloading onto the memory space an image of the bootable floppy disk such that each byte from the bootable floppy disk is saved at the corresponding byte location of the memory space.

12. A method as claimed in claim 10, wherein the memory space is connected to the target computer via a USB connection.

13. A method as claimed in claim 12, wherein the device and virtual CD-ROM are configured to present a bootable CD-ROM to the target computer.

14. A method as claimed in claim 8, wherein the memory space comprises a virtual CD-ROM residing on a server operatively connected to the KVM device.

15. A system for transferring data to a target computer, the system comprising:
  a remote computer; and
  a programmable KVM switch having a CPU and a memory space associated therewith;
  wherein the remote computer is connectable to the KVM switch, and the KVM switch is connectable to the target computer, so as to permit control of the target computer by the remote computer; and
  wherein the remote computer and KVM switch are programmed so as to:
  mount the memory space to the remote computer,
  transfer the data to the memory space and
  unmount the memory space from the remote computer; and
  wherein the remote computer, KVM switch and target computer are programmed to permit a user, by controlling the target computer through the remote computer, to:
  mount the memory space to the target computer,
  transfer the data from the memory space to the target computer, and
  unmount the memory space from the target computer.

16. The system of claim 15, wherein the memory space is configured so as to mimic the size and memory format of a bootable floppy disk, and so as to permit the target computer to reboot from the memory space.

17. The system of claim 16, wherein the switch is programmed to permit an image of the bootable floppy disk to be downloaded into the memory space, such that each byte from the bootable floppy disk is saved at the corresponding byte location of the memory space.

18. The system of claim 16, wherein the switch is configured so as to connect the memory space to the target computer via a USB connection.

19. The system of claim 16, wherein the switch is programmed, and the virtual CD-ROM configured, to present a bootable CD-ROM to the target computer.

* * * * *

UNITED STATES PATENT AND TRADEMARK OFFICE
CERTIFICATE OF CORRECTION

| | | |
|---|---|---|
| PATENT NO. | : 8,595,324 B2 | Page 1 of 1 |
| APPLICATION NO. | : 12/098655 | |
| DATED | : November 26, 2013 | |
| INVENTOR(S) | : Brian J. Carrigan et al. | |

It is certified that error appears in the above-identified patent and that said Letters Patent is hereby corrected as shown below:

In the Claims

Column 29, Line 12, Claim 7, delete "The system" and insert -- The device --

Signed and Sealed this
Eleventh Day of March, 2014

Michelle K. Lee
*Deputy Director of the United States Patent and Trademark Office*